United States Patent
Hu et al.

(10) Patent No.: US 12,273,150 B2
(45) Date of Patent: Apr. 8, 2025

(54) DELAY MEASUREMENT METHOD, NETWORK DEVICE, AND TERMINAL DEVICE

(71) Applicant: HUAWEI TECHNOLOGIES CO., LTD., Guangdong (CN)

(72) Inventors: Xingxing Hu, Shanghai (CN); Qinghai Zeng, Shanghai (CN); Hongping Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 630 days.

(21) Appl. No.: 17/392,523

(22) Filed: Aug. 3, 2021

(65) Prior Publication Data
US 2021/0367683 A1    Nov. 25, 2021

Related U.S. Application Data

(63) Continuation of application No. PCT/CN2020/074262, filed on Feb. 4, 2020.

(30) Foreign Application Priority Data

Feb. 14, 2019 (CN) .......................... 201910115158.6

(51) Int. Cl.
H04B 17/10 (2015.01)
H04W 24/10 (2009.01)
H04W 80/02 (2009.01)

(52) U.S. Cl.
CPC .......... *H04B 17/104* (2015.01); *H04W 24/10* (2013.01); *H04W 80/02* (2013.01)

(58) Field of Classification Search
CPC .... H04B 17/104; H04W 24/10; H04W 80/02; H04W 24/08; H04L 43/0858; H04L 43/0852
See application file for complete search history.

(56) References Cited

U.S. PATENT DOCUMENTS

| | | | |
|---|---|---|---|
| 2013/0114446 A1* | 5/2013 | Liu | H04W 24/10 370/252 |
| 2013/0189973 A1* | 7/2013 | Chang | H04L 41/069 455/423 |

(Continued)

FOREIGN PATENT DOCUMENTS

| | | |
|---|---|---|
| CN | 1852174 A | 10/2006 |
| CN | 101810027 A | 8/2010 |

(Continued)

OTHER PUBLICATIONS

LG Electronics Inc., UL packet delay measurement in MDT. 3GPP TSG-RAN WG2 Meeting #91, Beijing, China, Aug. 24 Aug. 28, 2015, R2-153182, 3 pages.

(Continued)

*Primary Examiner* — Sharmin Chowdhury

(57) ABSTRACT

Embodiments of this application provide a delay measurement method, a network device, and a terminal device. The method includes network device receiving first information from a core network requesting the network device to measure a transmission delay between the network device and the terminal device. The network device obtains a transmission delay measurement result in response to the first information, and sends second information to the core network within a first preset duration The second information provides an indication of the transmission delay measurement result.

19 Claims, 7 Drawing Sheets

(56) References Cited

U.S. PATENT DOCUMENTS

| | | | | |
|---|---|---|---|---|
| 2018/0041413 | A1* | 2/2018 | Yi | H04W 12/80 |
| 2018/0270688 | A1* | 9/2018 | Jung | H04W 36/0088 |
| 2020/0112975 | A1* | 4/2020 | Moon | H04L 47/28 |
| 2021/0153070 | A1* | 5/2021 | Velev | H04W 28/0268 |
| 2021/0204147 | A1* | 7/2021 | Axmon | H04W 24/10 |
| 2023/0098871 | A1* | 3/2023 | Liu | H04J 3/065 |
| | | | | 370/329 |

FOREIGN PATENT DOCUMENTS

| | | |
|---|---|---|
| CN | 102396175 A | 3/2012 |
| CN | 106454921 A | 2/2017 |
| CN | 107925592 A | 4/2018 |
| CN | 109245936 A | 1/2019 |
| EP | 1646183 B1 | 12/2007 |
| EP | 3297318 A1 | 3/2018 |
| WO | 2016161582 A1 | 10/2016 |

OTHER PUBLICATIONS

Kyocera, Potential solutions for UL latency measurements. 3GPP TSG-RAN WG2 #90, Fukuoka, Japan May 25-29, 2015, R2-152627, 2 pages.

Huawei, HiSilicon, Radio measurements for feMDT. 3GPP TSG-RAN WG2 Meeting #90, Fukuoka, Japan, May 25-29, 2015, R2-152290, 2 pages.

3GPP TS 38.413 V15.2.0 (Dec. 2018), 3rd Generation Partnership Project; Technical Specification Group Radio Access Network; NG-RAN; NG Application Protocol (NGAP)(Release 15), 308 pages.

LG Electronics Inc., UL latency m~asurement in MDT. 3GPP TSG-RAN WG2 Meeting#90, Fukuoka, Japan, May 25-May 29, 2015, R2-152296, 2 pages.

Huawei Technologies, Telecom Italia, Nokia, Deutsche Telecom, China Mobile, Cisco, Adding use case for measurement of user plane delay. 3GPP TSG SA WG5 (Telecom Management) Meeting #117, Jan. 29-Feb. 2, 2018, Rome, Italy, S5-181545, 2 pages.

3GPP TS 38.463 V15.2.0 (Dec. 2018), 3rd Generation Partnership Project; Technical Specification Group Radio Access Network; NG-RAN; E1 Application Protocol (E1AP)(Release 15), 160 pages.

Qualcomm Incorporated, Update solution#8 for Key Issue #4: QoS Monitoring. 3GPP TSG-SA WG2 Meeting #130, Kochi, India, Jan. 21-25, 2019, S2-1901361, 4 pages.

3GPP TS 38.331 V15.4.0 (Dec. 2018), 3rd Generation Partnership Project; Technical Specification Group Radio Access Network; NR; Radio Resource Control (RRC) protocol specification(Release 15), 474 pages.

3GPP TR 23.725 Draft V16.0.0+ (Feb. 2019), 3rd Generation Partnership Project; Technical Specification Group Services and System Aspects; Study on enhancement of Ultra-Reliable Low-Latency Communication (URLLC) support in the 5G Core network (5GC)(Release 16), 87 pages.

3GPP TS 38.415 V15.2.0 (Dec. 2018), 3rd Generation Partnership Project; Technical Specification Group Radio Access Network; NG-RAN; PDU Session User Plane Protocol(Release 15), 12 pages.

3GPP TS 23.501 V15.4.0 (Dec. 2018), 3rd Generation Partnership Project; Technical Specification Group Services and System Aspects; System Architecture for the 5G System; Stage 2(Release 15), 236 pages.

3GPP TS 23.502 V15.4.1 (Jan. 2019), 3rd Generation Partnership Project; Technical Specification Group Services and System Aspects; Procedures for the 5G System; Stage 2(Release 15), 347 pages.

3GPP TS 29.244 V15.4.0 (Dec. 2018), 3rd Generation Partnership Project; Technical Specification Group Core Network and Terminals; Interface between the Control Plane and the User Plane Nodes; Stage 3(Release 15), 194 pages.

* cited by examiner

DELAY MEASUREMENT METHOD, NETWORK DEVICE, AND TERMINAL DEVICE

CROSS-REFERENCE TO RELATED APPLICATIONS

This application is a continuation of International Patent Application No. PCT/CN2020/074262, filed on Feb. 4, 2020, which claims priority to Chinese Patent Application No. 201910115158.6, filed on Feb. 14, 2019. The disclosures of the aforementioned applications are hereby incorporated by reference in their entireties.

TECHNICAL FIELD

This application relates to communication technologies, and in particular, to a delay measurement method, a network device, and a terminal device.

BACKGROUND

To cope with explosive growth of mobile data traffic in the future, massive mobile communication device connections, and various emerging new services and application scenarios, a fifth generation (the fifth generation, 5G) mobile communication system has emerged. The 5G communication system may support a variety of different services. Supported services may include, for example, an enhanced mobile broadband (eMBB) service, a massive machine type communication (MTC) service, an ultra-reliable and low-latency communication (URLLC) service, a multimedia broadcast multicast (MBMS) service, and a positioning service.

With development of communication requirements, low-latency performance needs to be ensured for more services. For example, the URLLC service described above requires that a delay is within 0.5 ms. Therefore, to ensure service performance, a delay of a current network needs to be measured. However, how to measure a transmission delay between a network device and a terminal device in the current network is an urgent problem to be resolved.

SUMMARY

Embodiments of this application provide a delay measurement method, a network device, and a terminal device, to measure a transmission delay between a network device and a terminal device in a network.

According to a first aspect, an embodiment of this application provides a delay measurement method. In the method, a network device receives first information sent by a first device, where the first information is used to request the network device to measure a transmission delay between the network device and a terminal device. The network device obtains a transmission delay measurement result in response to the first information. The network device sends second information to the first device within first preset duration, where the second information is used to indicate the transmission delay measurement result.

In a possible implementation, the method further includes: When the network device fails to obtain the transmission delay measurement result within the first preset duration, the network device sends third information to the first device. The third information is used to indicate a failure in measurement of the transmission delay between the network device and the terminal device.

According to the method provided in this embodiment, the first device may trigger, by using the first information, the network device to measure the transmission delay between the network device and the terminal device. After receiving the first information, the network device may obtain the transmission delay measurement result in response to the first information, and feed back the transmission delay measurement result to the first device within the first preset duration by using the second information, to implement the transmission delay measurement between the network device and the terminal device in a 5G network. In addition, the first device may further learn of the transmission delay measurement result in a timely manner by using the first preset duration.

In an implementation, the transmission delay measurement result is obtained through measurement between the network device and the terminal device after the network device receives the first information. Alternatively, the transmission delay measurement result is obtained by the network device within second preset duration that is before the network device receives the first information. In this manner, a plurality of manners of obtaining the transmission delay measurement result may be extended. In addition, when the foregoing transmission delay measurement result reuses the transmission delay measurement result obtained by the network device within the second preset duration that is before the network device receives the first information, efficiency of obtaining the transmission measurement result by the network device can be improved, and unnecessary measurement costs can be reduced.

It should be understood that the foregoing first preset duration may be preset in the network device, may be indicated by the first device to the network device by using the first information, or may be indicated by the first device to the network device by using fourth information independent of the first information. In a possible implementation, the method further includes: The network device receives the fourth information from the first device. The fourth information is used to indicate the first preset duration. In this manner, the first preset duration may be flexibly configured based on a transmission delay measurement requirement.

When the transmission delay between the network device and the terminal device includes an uplink transmission delay between the network device and the terminal device, and the transmission delay measurement result is obtained through measurement between the network device and the terminal device after the network device receives the first information, that the network device obtains the transmission delay measurement result may include the following two implementations:

Manner 1: The network device receives an uplink PDU from the terminal device, where the uplink PDU includes time information for generating the uplink PDU by a radio access-stratum protocol layer of the terminal device. The network device determines a measurement result of an uplink transmission delay between the network device and the terminal device based on the time information for generating the uplink PDU by the radio access-stratum protocol layer of the terminal device and a time at which a radio access-stratum protocol layer of the network device receives the uplink PDU.

Manner 2: The network device receives an uplink PDU from the terminal device, where the uplink PDU includes an uplink SDU and time information for receiving the uplink SDU by a radio access-stratum protocol layer of the terminal device. The network device determines a measurement result of an uplink transmission delay between the network device and the terminal device based on the time information for receiving the uplink SDU by the radio access-stratum protocol layer of the terminal device and a time at which a radio access-stratum protocol layer of the network device sends the uplink SDU to a protocol layer upper than the radio access-stratum protocol layer.

Uplink transmission delay measurement between the network device and the terminal device may be implemented in the foregoing two manners.

It should be understood that, when the foregoing uplink transmission delay measurement is performed by the terminal device triggered by the network device, before the network device obtains the transmission delay measurement result, the method further includes: The network device sends first indication information to the terminal device. The first indication information is used to trigger the terminal device to perform the uplink transmission delay measurement. For example, that the network device sends first indication information to the terminal device includes: The network device sends one or more downlink protocol data units PDUs to the terminal device. The first indication information is carried in the one or more downlink PDUs.

In another implementation, the first indication information is specifically used to trigger the terminal device to perform the uplink transmission delay measurement within third preset duration. The foregoing third preset duration may be less than the first preset duration. In this manner, it may be constrained that the terminal device and the network device complete the uplink transmission delay measurement within the first preset duration as much as possible. It may be understood that the foregoing third preset duration may be preset in the terminal device, or may be indicated by the network device to the terminal device by using the first indication information. In other words, the first indication information is specifically used to trigger the terminal device to perform the uplink transmission delay measurement within the third preset duration. Alternatively, the foregoing third preset duration may be sent by the network device to the terminal device by using other indication information. This is not limited.

When the uplink transmission delay measurement is performed by the terminal device triggered by a core network device, the uplink PDU further includes fifth information. The fifth information is used to indicate that the uplink PDU carries the time information for generating the uplink PDU by the radio access-stratum protocol layer of the terminal device or the time information for receiving the uplink SDU by the radio access-stratum protocol layer of the terminal device. By using the fifth information, after receiving the uplink PDU, the network device may learn in a timely manner that the uplink PDU carries the time information for generating the uplink PDU by the radio access-stratum protocol layer of the terminal device or the time information for receiving the uplink SDU by the radio access-stratum protocol layer of the terminal device, so that the network device can determine the uplink transmission delay measurement between the network device and the terminal device based on the carried time information.

When the transmission delay between the network device and the terminal device includes a downlink transmission delay between the network device and the terminal device, and the transmission delay measurement result is a value of the downlink transmission delay, if a network device stores distribution information of the downlink transmission delay between the network device and the terminal device obtained by the network device from the terminal device within the second preset duration before the network device receives the first information, the network device may obtain the value of the downlink transmission delay by using the following method.

The network device determines the value of the downlink transmission delay between the network device and the terminal device based on the distribution information of the downlink transmission delay between the network device and the terminal device. The distribution information of the downlink transmission delay is reported by the terminal device to the network device within the second preset duration.

Because different devices in a network that have a requirement for measuring the transmission delay between the network device and the terminal device require different transmission delay information, in the foregoing manner, transmission delay information required by various devices can be met, and a same mechanism can be used to perform the transmission delay measurement between the terminal device and the network device, thereby reducing complexity of network configuration.

In another implementation, the method further includes: The network device sends sixth information to the terminal device. The sixth information is used to indicate the measurement result of the uplink transmission delay between the network device and the terminal device. In this manner, the terminal device can learn of the measurement result of the uplink transmission delay between the network device and the terminal device in a timely manner.

In another implementation, the first device is the core network device, and the method further includes: The network device receives seventh information from the core network device. The seventh information is used to indicate a measurement result of a transmission delay between the core network device and the terminal device and/or a measurement result of a transmission delay between the core network device and the network device; and the network device sends the seventh information to the terminal device. In this manner, the terminal device can learn of the measurement result of the transmission delay between the core network device and the terminal device, and/or the measurement result of the transmission delay between the core network device and the network device in a timely manner.

According to a second aspect, an embodiment of this application provides a delay measurement method. This embodiment describes how a terminal device measures an uplink transmission delay when a core network device triggers, by using a non-access stratum message, the terminal device to measure the uplink transmission delay. For example, a radio access stratum protocol layer of the terminal device generates an uplink PDU based on second indication information of an upper-layer protocol layer of the terminal device, where the uplink PDU includes time information for generating the uplink PDU by the radio access stratum protocol layer of the terminal device; or the uplink PDU includes an uplink SDU and time information of receiving the uplink SDU by a radio access stratum protocol layer of the terminal device. The second indication information is used to indicate to perform uplink transmission delay measurement on the uplink PDU. The terminal device sends the uplink PDU to a network device.

According to the method provided in this embodiment of this application, the core network device may trigger, by using the non-access-stratum message, the terminal device to perform the uplink transmission delay measurement, to extend a manner of measuring the uplink transmission delay between the network device and the terminal device.

In an implementation, the uplink PDU further includes fifth information. The fifth information is used to indicate that the uplink PDU carries the time information for generating the uplink PDU by the radio access-stratum protocol layer of the terminal device or the time information for receiving the uplink SDU by the radio access-stratum protocol layer of the terminal device. By using the fifth information, after receiving the uplink PDU, the network device may learn in a timely manner that the uplink PDU carries the time information for generating the uplink PDU by the radio access-stratum protocol layer of the terminal device or the time information for receiving the uplink SDU by the radio access-stratum protocol layer of the terminal device, so that the network device can determine a measurement result of an uplink transmission delay between the network device and the terminal device based on the carried time information.

In another implementation, the method further includes: The terminal device receives third indication information from the core network device. The third indication information is used to indicate an identifier of a service for performing the uplink transmission delay measurement, and the uplink PDU is an uplink PDU of a service corresponding to the identifier of the service. In this manner, the core network device may constrain the terminal device to perform the uplink transmission delay measurement on which uplink PDUs, to enrich uplink transmission delay measurement manners.

In another implementation, the method further includes: The terminal device receives sixth information from the network device or a first device. The sixth information is used to indicate the measurement result of the uplink transmission delay between the network device and the terminal device. In this manner, the terminal device can learn of the measurement result of the uplink transmission delay between the network device and the terminal device in a timely manner.

In another implementation, the method further includes: The terminal device receives seventh information from the network device. The seventh information is used to indicate a measurement result of a transmission delay between the core network device and the terminal device and/or a measurement result of a transmission delay between the core network device and the network device. In this manner, the terminal device can learn of the measurement result of the transmission delay between the core network device and the terminal device, and/or the measurement result of the transmission delay between the core network device and the network device in a timely manner.

According to a third aspect, an embodiment of this application provides a network device. The network device includes a receiving module, a processing module, and a sending module.

The receiving module is configured to receive first information sent by a first device. The first information is used to request the network device to measure a transmission delay between the network device and a terminal device. The processing module is configured to obtain a transmission delay measurement result in response to the first information. The sending module is configured to send second information to the first device within first preset duration. The second information is used to indicate the transmission delay measurement result.

In an implementation, the transmission delay measurement result is obtained through measurement between the network device and the terminal device after the network device receives the first information. Alternatively, the transmission delay measurement result is obtained by the network device within second preset duration that is before the network device receives the first information.

In another implementation, the sending module is further configured to: when the transmission delay measurement result fails to be obtained within the first preset duration, send third information to the first device. The third information is used to indicate a failure in measurement of the transmission delay between the network device and the terminal device.

In another implementation, the receiving module is further configured to receive fourth information from the first device. The fourth information is used to indicate the first preset duration.

In another implementation, the transmission delay between the network device and the terminal device includes an uplink transmission delay between the network device and the terminal device.

When the transmission delay between the network device and the terminal device includes an uplink transmission delay between the network device and the terminal device, and the transmission delay measurement result is obtained through measurement between the network device and the terminal device after the network device receives the first information, the receiving module is further configured to receive an uplink PDU from the terminal device, where the uplink PDU includes time information for generating the uplink PDU by a radio access-stratum protocol layer of the terminal device. The processing module is configured to determine the measurement result of the uplink transmission delay between the network device and the terminal device based on the time information for generating the uplink PDU by the radio access-stratum protocol layer of the terminal device and a time at which a radio access-stratum protocol layer of the network device receives the uplink PDU.

Alternatively, the receiving module is further configured to receive an uplink PDU from the terminal device, where the uplink PDU includes an uplink SDU and time information for receiving the uplink SDU by a radio access-stratum protocol layer of the terminal device. The processing module is configured to determine the measurement result of the uplink transmission delay between the network device and the terminal device based on the time information for receiving the uplink SDU by the radio access-stratum protocol layer of the terminal device and a time at which a radio access-stratum protocol layer of the network device sends the uplink SDU to a protocol layer upper than the radio access-stratum protocol layer.

It should be understood that, when the foregoing uplink transmission delay measurement is performed by the terminal device triggered by the network device, the sending module is further configured to: before the processing module obtains the transmission delay measurement result, send first indication information to the terminal device. The first indication information is used to trigger the terminal device to perform the uplink transmission delay measurement. For example, the sending module is configured to send one or more downlink protocol data units PDUs to the terminal device. The first indication information is carried in the one or more downlink PDUs. In a possible implementation, the first indication information is specifically used to trigger the terminal device to perform the uplink transmission delay measurement within third preset duration.

When the foregoing uplink transmission delay measurement is performed by the terminal device triggered by a core network device, the uplink PDU further includes fifth information. The fifth information is used to indicate that the uplink PDU carries the time information for generating the uplink PDU by the radio access-stratum protocol layer of the terminal device or the time information for receiving the uplink SDU by the radio access-stratum protocol layer of the terminal device.

In an implementation, the sending module is further configured to send sixth information to the terminal device. The sixth information is used to indicate the measurement result of the uplink transmission delay between the network device and the terminal device.

In another implementation, the transmission delay between the network device and the terminal device includes a downlink transmission delay between the network device and the terminal device. The transmission delay measurement result is a value of the downlink transmission delay. The processing module is configured to determine a value of the downlink transmission delay between the network device and the terminal device based on distribution information of the downlink transmission delay between the network device and the terminal device, where the distribution information of the downlink transmission delay is reported by the terminal device to the network device within the second preset duration.

In another implementation, the first device is the core network device, and the receiving module is further configured to receive seventh information from the core network device. The seventh information is used to indicate a measurement result of a transmission delay between the core network device and the terminal device and/or a measurement result of a transmission delay between the core network device and the network device. The sending module is further configured to send the seventh information to the terminal device.

For beneficial effects of the network device provided in the third aspect and the possible implementations of the third aspect, refer to beneficial effects brought by the first aspect and the possible implementations of the first aspect. Details are not described herein again.

According to a fourth aspect, an embodiment of this application provides a terminal device. The terminal device includes a processing module, and a sending module. Optionally, the terminal device further includes a receiving module.

The processing module is configured to generate an uplink PDU at a radio access-stratum protocol layer based on second indication information of a protocol layer upper than the radio access-stratum protocol layer. The uplink PDU includes time information for generating the uplink PDU by the radio access-stratum protocol layer of the terminal device, or the uplink PDU includes an uplink SDU and time information for receiving the uplink SDU by a radio access-stratum protocol layer of the terminal device. The second indication information is used to indicate to perform uplink transmission delay measurement on the uplink PDU. The sending module is configured to send the uplink PDU.

In an implementation, the uplink PDU further includes fifth information. The fifth information is used to indicate that the uplink PDU carries the time information for generating the uplink PDU by the radio access-stratum protocol layer of the terminal device or the time information for receiving the uplink SDU by the radio access-stratum protocol layer of the terminal device.

In another implementation, the receiving module is configured to receive third indication information from a core network device. The third indication information is used to indicate an identifier of a service for performing the uplink transmission delay measurement, and the uplink PDU is an uplink PDU of a service corresponding to the identifier of the service.

In another implementation, the receiving module is configured to receive sixth information from the network device or a first device. The sixth information is used to indicate a measurement result of an uplink transmission delay between the network device and the terminal device.

In another implementation, the receiving module is configured to receive seventh information from the network device. The seventh information is used to indicate a measurement result of a transmission delay between the core network device and the terminal device and/or a measurement result of a transmission delay between the core network device and the network device.

For beneficial effects of the terminal device provided in the fourth aspect and the possible implementations of the fourth aspect, refer to beneficial effects brought by the second aspect and the possible implementations of the second aspect. Details are not described herein again.

According to a fifth aspect, an embodiment of this application provides a network device. The network device includes a processor, a memory, a receiver, and a transmitter. The receiver and the transmitter are both coupled to the processor. The processor controls a receiving action of the receiver, and controls a sending action of the transmitter.

The memory is configured to store computer-executable program code, and the program code includes instructions. When the processor executes the instructions, the instructions enable the network device to perform the method according to any one of the first aspect or the possible implementations of the first aspect.

According to a sixth aspect, an embodiment of this application provides a terminal device. The terminal device includes a processor, a memory, a receiver, and a transmitter. The receiver and the transmitter are both coupled to the processor. The processor controls a receiving action of the receiver, and controls a sending action of the transmitter.

The memory is configured to store computer-executable program code, and the program code includes instructions. When the processor executes the instructions, the instructions enable the terminal device to perform the method according to any one of the second aspect or the possible implementations of the second aspect.

According to a seventh aspect, an embodiment of this application provides a communication apparatus, including a unit, module, or circuit configured to perform the method according to any one of the first aspect or the possible implementations of the first aspect. The communication apparatus may be a network device, or may be a module used in a network device, for example, a chip used in the network device.

According to an eighth aspect, an embodiment of this application provides a communication apparatus, including a unit, module, or circuit configured to perform the method according to any one of the second aspect or the possible implementations of the second aspect. The communication apparatus may be a terminal device, or may be a module used in a terminal device, for example, a chip used in the terminal device.

According to a ninth aspect, an embodiment of this application provides a computer program product including instructions. When the computer program product is run on a computer, the computer is enabled to perform the method according to any one of the first aspect or the possible implementations of the first aspect.

According to a tenth aspect, an embodiment of this application provides a computer program product including instructions. When the computer program product is run on a computer, the computer is enabled to perform the method according to any one of the second aspect or the possible implementations of the second aspect.

According to an eleventh aspect, an embodiment of this application provides a computer-readable storage medium. The computer-readable storage medium stores an instruction, and when the instruction is run on a computer, the computer is enabled to perform the method according to any one of the first aspect or the possible implementations of the first aspect.

According to a twelfth aspect, an embodiment of this application provides a computer-readable storage medium. The computer-readable storage medium stores instructions. When the computer-readable storage medium is run on a computer, the computer is enabled to perform the method according to any one of the second aspect or the possible implementations of the second aspect.

According to a thirteenth aspect, an embodiment of this application provides a communication apparatus. The communication apparatus stores a computer program. When the computer program is executed by the communication apparatus, the method according to any one of the first aspect or the possible implementations of the first aspect is implemented. The communication apparatus herein may be, for example, a chip.

According to a fourteenth aspect, an embodiment of this application provides a communication apparatus. The communication apparatus stores a computer program. When the computer program is executed by the communication apparatus, the method according to any one of the second aspect or the possible implementations of the second aspect is implemented. The communication apparatus herein may be, for example, a chip.

According to a fifteenth aspect, a communication apparatus is provided. The communication apparatus may be the network device in the third aspect or the possible implementations of the third aspect, or may be a chip disposed in the network device. The communication apparatus includes a processor. The processor is coupled to a memory, and may be configured to execute instructions in the memory, to implement the method in the first aspect or the possible implementations of the first aspect. Optionally, the communication apparatus further includes the memory. Optionally, the communication apparatus further includes a communication interface, and the processor is coupled to the communication interface.

When the communication apparatus is the network device, the communication interface may be a transceiver or an input/output interface.

When the communication apparatus is the chip disposed in the network device, the communication interface may be an input/output interface.

Optionally, the transceiver may be a transceiver circuit. Optionally, the input/output interface may be an input/output circuit.

According to a sixteenth aspect, a communication apparatus is provided. The communication apparatus may be the terminal device in the fourth aspect or the possible implementations of the fourth aspect, or may be a chip disposed in the terminal device. The communication apparatus includes a processor. The processor is coupled to a memory, and may be configured to execute instructions in the memory, to implement the method in the second aspect or the possible implementations of the second aspect. Optionally, the communication apparatus further includes the memory. Optionally, the communication apparatus further includes a communication interface, and the processor is coupled to the communication interface.

When the communication apparatus is the terminal device, the communication interface may be a transceiver or an input/output interface.

When the communication apparatus is the chip disposed in the terminal device, the communication interface may be an input/output interface.

Optionally, the transceiver may be a transceiver circuit. Optionally, the input/output interface may be an input/output circuit.

According to a seventeenth aspect, an embodiment of this application provides a communication system, including a terminal device and a network device. The network device is configured to perform the method in any one of the first aspect or the possible implementations of the first aspect. The terminal device is configured to perform the method in any one of the second aspect or the possible implementations of the second aspect. Optionally, the communication system may further include a first device.

According to an eighteenth aspect, an embodiment of this application provides a chip. The chip is connected to a memory, and is configured to read and execute a software program stored in the memory, to implement the method provided in any one of the first aspect to the second aspect, or the possible implementations of the first aspect to the second aspect.

According to a nineteenth aspect, an embodiment of this application provides a chip. The chip includes a processor and a memory. The processor is configured to read and execute a software program stored in the memory, to implement the method provided in any one of the first aspect to the second aspect, or the possible implementations of the first aspect to the second aspect.

According to a delay measurement method, a network device, and a terminal device provided in this embodiment, a first device may trigger, by using first information, the network device to measure a transmission delay between the network device and the terminal device. After receiving the first information, the network device may obtain a transmission delay measurement result in response to the first information, and feed back the transmission delay measurement result to the first device within first preset duration by using second information, to implement transmission delay measurement between the network device and the terminal device in a 5G network. In addition, the first device may further learn of the transmission delay measurement result in a timely manner by using the first preset duration.

DESCRIPTION OF EMBODIMENTS

Figure 1:
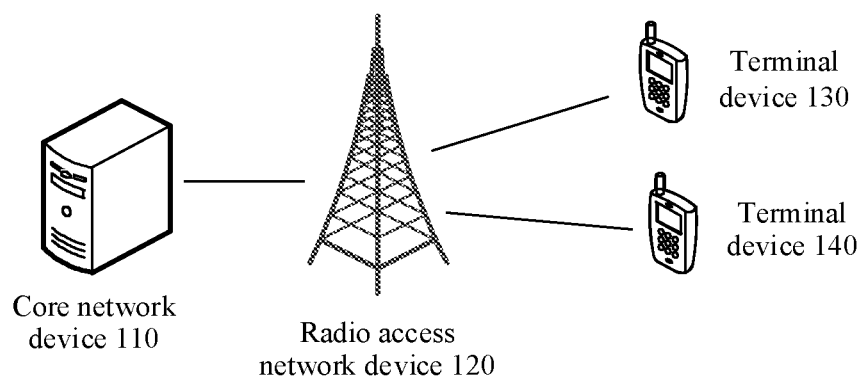
FIG. 1 is a schematic diagram of an architecture of a mobile communication system to which an embodiment of this application is applicable.

FIG. 1 is a schematic architectural diagram of a mobile communication system to which an embodiment of this application is applied. As shown in FIG. 1, the mobile communication system may include a core network device 110, a radio access network (RAN) device 120, and at least one terminal device (for example, a terminal device 130 and a terminal device 140 in FIG. 1). The terminal device is connected to the radio access network device 120 in a wireless manner, and the radio access network device 120 is connected to the core network device 110 in a wireless or wired manner. The core network device 110 and the radio access network device 120 may be different independent physical devices, or functions of the core network device 110 and logical functions of the radio access network device 120 may be integrated into one physical device, or some functions of the core network device 110 and some functions of the radio access network device 120 may be integrated into one physical device. The terminal device may be at a fixed position or may be movable. FIG. 1 is only a schematic diagram. The mobile communication system may further include another network device, for example, may further include a wireless relay device and a wireless backhaul device, which are not shown in FIG. 1. A quantity of core network devices 110, a quantity of radio access network devices 120, and a quantity of terminal devices included in the mobile communication system are not limited in this embodiment of this application.

The radio access network device 120 is an access device used by a terminal device to access the mobile communication system in a wireless manner, and may be a base station NodeB, an evolved NodeB (evolutional node B, eNB or eNodeB), a base station (for example, a transmission and reception point (transmission and reception point, TRP), or a controller) in a 5G mobile communication system or a new radio (NR) communication system, a base station in a future mobile communication system, an access node in a Wi-Fi system, a relay station, or the like. A specific technology and a specific device form used by the radio access network device 120 are not limited in this embodiment of this application. In this embodiment of this application, the radio access network device 120 is referred to as a network device for short. Unless otherwise specified, in the embodiments of this application, the network device is the radio access network device 120. In addition, in this embodiment of this application, the terms 5G and NR may be equivalent.

The terminal device may also be referred to as a terminal, user equipment (UE), a mobile station (MS), a mobile terminal (MT), or the like. The terminal device may be a mobile phone, a pad, a computer having a wireless transceiver function, a virtual reality (VR) terminal device, an augmented reality (AR) terminal device, a wireless terminal in industrial control, a wireless terminal in self-driving (i.e., autonomous vehicle), a wireless terminal in a remote medical surgery, a wireless terminal in a smart grid, a wireless terminal in transportation safety, a wireless terminal in a smart city, a wireless terminal in a smart home, and the like.

The radio access network device 120 and the terminal device may be deployed on land, including an indoor or outdoor device, a handheld device, or a vehicle-mounted device; may be deployed on water; or may be deployed on an aircraft, a balloon, and a satellite in the air. An application scenario of the radio access network device 120 and the terminal device is not limited in this embodiment of this application.

Communication between the radio access network device 120 and the terminal device may be performed by using a licensed spectrum, or an unlicensed spectrum, or both a licensed spectrum and an unlicensed spectrum. Communication between the radio access network device 120 and the terminal device may be performed by using a spectrum below 6 gigahertz (GHz), a spectrum above 6 GHz, or both a spectrum below 6 GHz and a spectrum above 6 GHz. A spectrum resource used between the radio access network device 120 and the terminal device is not limited in this embodiment of this application.

Currently, in the 5G mobile communication system (referred to as a "5G system" for short), when a network device communicates with a terminal device, the following protocol layers are involved (sometimes these protocol layers are collectively referred to as a "radio access-stratum"), a protocol layer of a wireless network, a radio protocol layer, a radio air interface protocol layer, or a radio access-stratum protocol layer, and are not distinguished in the embodiments of this application.

Radio resource control (RRC) layer is configured to perform broadcast, paging, RRC link establishment, radio bearer (RB) control, mobility, control of measurement report of terminal device, and the like.

Service data adaptation protocol (SDAP) layer is responsible for mapping each quality of service flow (QoS flow) from a 5 generation core (5GC) to a data radio bearer (DRB), that is, transmitting, on a corresponding DRB based on a service attribute corresponding to the QoS flow, a data packet corresponding to a QoS flow. In this embodiment of this application, the SDAP layer is a protocol layer newly introduced in the 5G system.

Packet data convergence protocol (PDCP) layer: There may be a plurality of PDCP entities at the PDCP layer, and each entity bears data of one RB, and may provide services such as security, header compression, encryption, and handover. The PDCP layer can ensure that data submitted to an upper layer is in order (that is, the data is submitted in order).

Radio link control (RLC) layer: There may be a plurality of RLC entities at the RLC layer, and each RLC entity corresponds to one PDCP entity and is configured to provide services such as segmentation, reassembly, and retransmission for the PDCP entity. The RLC layer can also ensure that data submitted to an upper layer is in order (that is, the data is submitted in order).

Medium access control (MAC) layer provides a data transmission service for a service on a logical channel for purposes of, for example, scheduling, acknowledgment and negative acknowledgment of a hybrid automatic repeat request (HARQ), and the like.

Physical (PHY) layer: performs coding and transmission on data delivered from the MAC layer.

Figure 2A:
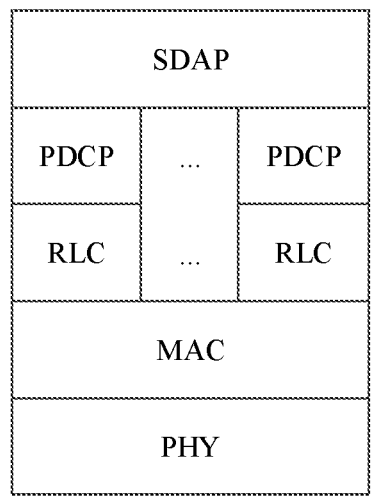
FIG. 2A is a schematic diagram 1 of a protocol stack structure in a 5G mobile communication system.

FIG. 2A is a schematic diagram 1 of a protocol stack structure in a 5G mobile communication system. As shown in FIG. 2A, when user plane data is transmitted between a network device and a terminal device, protocol layers of the network device and protocol layers of the terminal device are an SDAP layer, a PDCP layer, an RLC layer, a MAC layer, and a PHY layer from top to bottom.

Figure 2B:
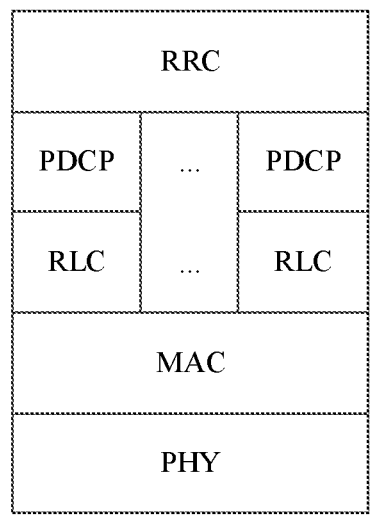
FIG. 2B is a schematic diagram 2 of a protocol stack structure in a 5G mobile communication system.

FIG. 2B is a schematic diagram 2 of a protocol stack structure in a 5G mobile communication system. As shown in FIG. 2B, when control plane data is transmitted between a network device and a terminal device, protocol layers of the network device and protocol layers of the terminal device are an RRC layer, a PDCP layer, an RLC layer, a MAC layer, and a PHY layer from top to bottom.

With reference to FIG. 2A and FIG. 2B, from top to bottom, for each protocol layer, data input from an upper protocol layer to a current protocol layer is referred to as a service data unit (SDU) of the current layer, and data obtained by processing the SDU at the current layer is referred to as a protocol data unit (PDU) at the current layer. For example, the PDCP layer is used as an upper protocol layer of the RLC layer, and the current protocol layer is the RLC layer. Data input by the PDCP layer to the RLC layer is referred to as a PDCP PDU for the PDCP layer, and the data is referred to as an RLC SDU for the RLC layer. A PDU of the RLC layer is obtained by processing the SDU at the RLC layer. Similarly, the RRC layer or the SDAP layer may be an upper protocol layer of the PDCP layer, the RLC layer may be an upper protocol layer of the MAC layer, and the MAC layer may be an upper protocol layer of the PHY layer. Correspondingly, a relationship between a PDU of an upper protocol layer, an SDU of a current protocol layer, and a PDU is obtained by analogy, and details are not described again.

In a possible manner, when communication is performed by using the protocol stack structures shown in FIG. 2A and FIG. 2B, a network device in the 5G mobile communication system may be a base station (for example, a gNB) in a Central Unit-Distributed Unit (CU-DU) split architecture. The base station may be connected to a core network device (for example, a core network in an LTE or a core network in the 5G). The CU and the DU may be understood as a division of the base station from a perspective of a logical function. The CU and the DU may be physically separated or physically deployed together. A plurality of DUs may share one CU. One DU may alternatively be connected to a plurality of CUs (not shown in the figure). The CU and the DU may be connected through an interface, for example, an F1 interface.

Optionally, functions of the CU and functions of the DU may be divided based on a protocol layer of a wireless network. For example, functions of the RRC layer, the SDAP layer, and the PDCP layer are set on the CU, and functions of the RLC layer, the MAC layer, the PHY layer, and the like are set on the DU. It may be understood that, the foregoing division of the functions of the CU and the functions of the DU based on protocol layers is merely an example, and the functions of the CU and the DU may alternatively be divided in another manner. For example, the CU or the DU may have functions of more protocol layers, or the CU or the DU may further have some processing functions of a protocol layer. For example, some functions of the RLC layer and functions of protocol layers above the RLC layer may be set on the CU, and remaining functions of the RLC layer and functions of protocol layers below the RLC layer may be set on the DU.

Alternatively, the functions of the CU and the functions of the DU may be divided based on a service type or another system requirement. For example, functions are divided based on a delay. A function whose processing time needs to meet a delay requirement is set on the DU, and a function that does not need to meet the delay requirement is set on the CU.

Alternatively, the CU may have one or more functions of a core network. One or more CUs may be disposed in a centralized manner or a separated manner. For example, the CU may be disposed on a network side for centralized management. The DU may have a plurality of radio frequency functions, and the radio frequency functions may be remotely set.

Figure 3:
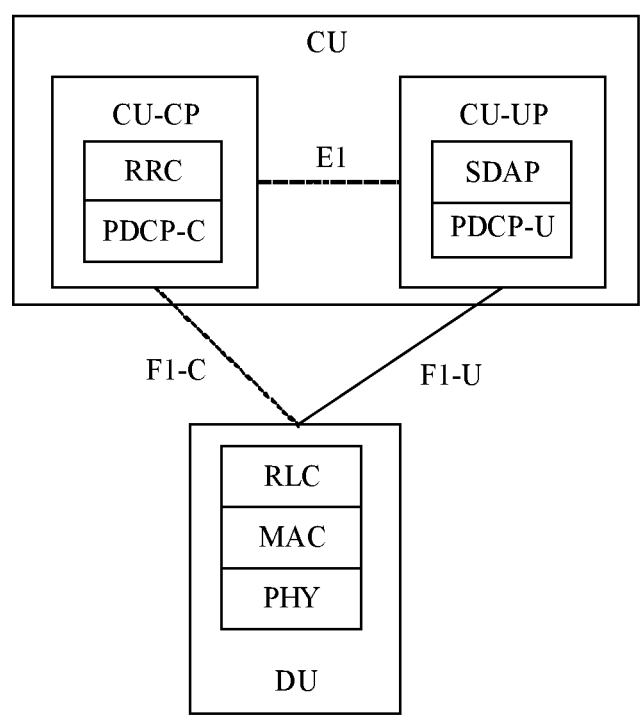
FIG. 3 is a schematic diagram of a protocol stack of a network device according to an embodiment of this application.

It should be understood that the functions of the CU may be implemented by one entity, or may be implemented by different entities. Optionally, the functions of the CU may be further divided. For example, FIG. 3 is a schematic diagram of a protocol stack of a network device according to an embodiment of this application. As shown in FIG. 3, a control plane (CP) and a user plane (UP) of a CU may be separated, that is, a control plane of the CU is CU-CP and a user plane of the CU is CU-UP. The CU-CP and the CU-UP may be implemented by different function entities. The CU-CP and the CU-UP may be coupled to a DU to jointly implement functions of a base station. In a possible manner, the CU-CP is responsible for control plane functions, including a function of an RRC layer and a function of a PDCP-C. The PDCP-C is mainly responsible for encryption and decryption, integrity protection, data transmission, and the like of control plane data. The CU-UP is responsible for user plane functions, including a function of an SDAP layer and a function of a PDCP-U. The PDCP-U is mainly responsible for encryption and decryption, integrity protection, header compression, serial number maintenance, data transmission, and the like of a data plane. The CU-CP and the CU-UP may be connected through an E1 interface. On behalf of the base station, the CU-CP may be connected to a core network through an Ng interface, and may be connected to the DU through an F1-C (control plane), and the CU-UP is connected to the DU through an F1-U (user plane). Optionally, in another possible implementation, a function of the PDCP-C is also on a CU-UP side (not shown in the figure).

A 5G system may support different services, for example, an enhanced mobile broadband (eMBB) service, a massive machine type communication (MTC) service, an ultra-reliable and low-latency communication (URLLC) service, a multimedia broadcast multicast service (MBMS), or a positioning service. With development of communication requirements, low-latency performance needs to be ensured for more services. For example, the URLLC service described above requires that a delay is within 0.5 ms. Therefore, to ensure service performance, a delay of a current network needs to be measured, and delay performance of the current network needs to be learned in time.

Currently, the core network device measures a transmission delay between the core network device and the network device in the following manner. Details are as follows:

The core network device sends a data packet A to the network device. The data packet A may be a detection packet specially used to measure a transmission delay, or may be a service data packet. In addition, the core network device may record a time T1 at which the data packet A is sent to the network device.

After receiving the data packet A, the network device records a time T2 at which the data packet A is received. Then, the network device may feed back a delay measurement result to the core network device. The delay measurement result may carry the time T2 at which the network device receives the data packet A and a time T3 at which the network device sends the delay measurement result.

After receiving the delay measurement result, the core network device may obtain an uplink transmission delay or a downlink transmission delay between the core network device and the network device based on a time T4 at which the delay measurement result is received, the time T2 at which the network device receives the data packet A, the time T3 at which the network device sends the delay measurement result, and the time T1 at which the data packet A is sent to the network device.

Although how the core network device measures the uplink transmission delay or the downlink transmission delay between the core network device and the network device is described in the foregoing manner, the foregoing manner does not include how to measure a transmission delay between the network device and a terminal device. Therefore, how to measure the transmission delay between the network device and the terminal device is an urgent problem to be resolved.

In consideration of the foregoing problem, an embodiment of this application provides a delay measurement method, to measure the transmission delay between the network device and the terminal device in a 5G network. It should be understood that the method provided in this embodiment of this application may be applied to not only a scenario in which a gNB is connected to a 5GC in the 5G network, but also a scenario in which an LTE eNB is connected to a 5GC (in this scenario, the LTE eNB may also be referred to as an ng-Enb), and is further applicable to a scenario in which the LTE eNB is connected to a 4G core network EPC. This is not specifically limited in this application.

The following describes technical solutions of the embodiments of this application in detail with reference to specific embodiments. The following several specific embodiments may be combined with each other, and a same or similar concept or process may not be described repeatedly in some embodiments.

Figure 4:
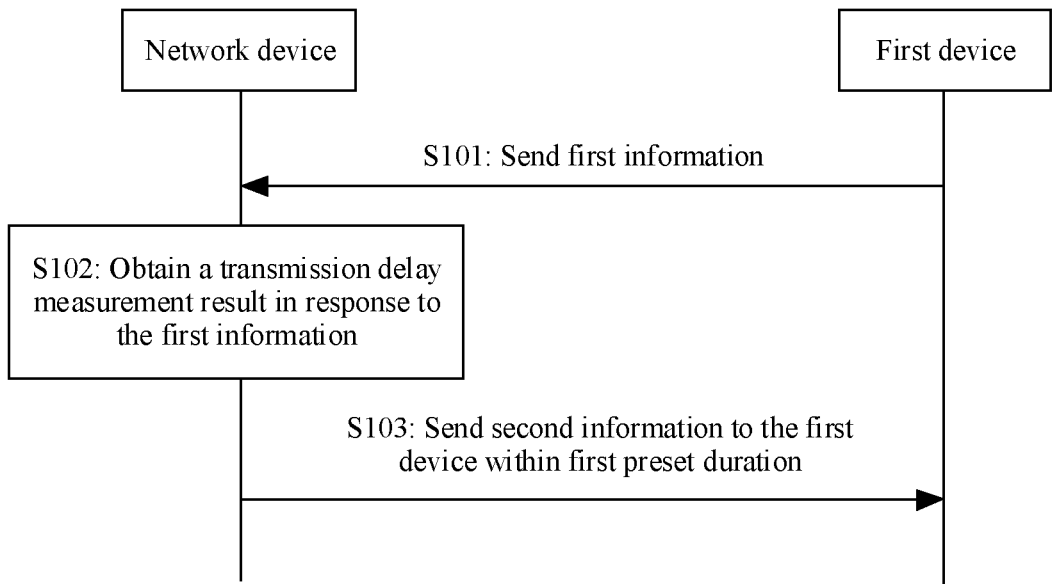
FIG. 4 is a schematic flowchart of a delay measurement method according to an embodiment of this application.

FIG. 4 is a schematic flowchart of a delay measurement method according to an embodiment of this application. As shown in FIG. 4, the method includes the following steps.

S101: A first device sends first information to a network device.

The first information is used to request the network device to measure a transmission delay between the network device and a terminal device. The transmission delay herein may include an uplink transmission delay and/or a downlink transmission delay.

The network device subsequently receives the first information.

The foregoing first device may be any device that has a function of triggering the network device to measure the transmission delay between the network device and the terminal device, for example, a core network device or a network management device. The core network device described herein may be, for example, a user plane function (UPF) network element, an access and mobility management function (AMF) network element, a session manage-ment function (SMF) network element, a policy control function (PCF) network element, or a unified data management function (UDM) network element.

When the foregoing first device is the core network device, in an implementation, the core network device may send the first information to the network device through a user plane to trigger the network device to measure the transmission delay between the network device and the terminal device. For example, the core network device may include the first information in a packet header or an extension header of GPRS tunneling protocol for the user plane (GTP-U) packet of the user plane to instruct the network device to measure the transmission delay between the network device and the terminal device. The GTP-U packet herein may be a GTP-U packet carrying service data, or may be a GTP-U packet corresponding to another message, or the like. Optionally, the foregoing first information may be further used to measure a transmission delay between the core network device and the network device.

S102: The network device obtains a transmission delay measurement result in response to the first information.

In an implementation, the transmission delay measurement result is obtained through measurement between the network device and the terminal device after the network device receives the first information.

After receiving the first information, the network device may perform transmission delay measurement with the terminal device to obtain the transmission delay measurement result.

In another implementation, the transmission delay measurement result is obtained by the network device within second preset duration that is before the network device receives the first information. It should be understood that the foregoing second preset duration may be the same as or different from first preset duration. The foregoing second preset duration may be preset in the network device, may be indicated by the first device to the network device by using the first information, or may be indicated by the first device to the network device by using other information independent of the first information. This is not limited.

In some embodiments, the network device may use, as a current transmission delay measurement result, the transmission delay measurement result obtained by the network device within the second preset duration that is before the network device receives the first information. Alternatively, the network device may first determine whether the transmission delay measurement result obtained by the network device within the second preset duration before the first information is received is stored. If the transmission delay measurement result is stored, the network device may use the measurement result as a current delay measurement result. If the transmission delay measurement result is not stored, the network device and the terminal device perform transmission delay measurement to obtain the transmission delay measurement result. In this manner, efficiency of obtaining the transmission measurement result by the network device can be improved, and unnecessary measurement overhead can be reduced when the transmission delay measurement result obtained by the network device within the second preset duration prior to the first information is received can be reused.

The foregoing transmission delay measurement result may be a transmission delay value or transmission delay distribution, and may be specifically determined based on a delay measurement requirement of a communication system.

The transmission delay distribution described herein refers to a distribution status of a transmission delay in a period of time. Distribution information of the downlink transmission delay between the network device and the terminal device is used as an example. In an implementation, the distribution information of the downlink transmission delay described herein may be distribution of a plurality of delay periods. The division of the plurality of delay periods may be communicated by the network device to the terminal device, or may be preset. For example, if the plurality of delay periods corresponding to the distribution information of the downlink transmission delay is <0.3 ms, 0.3 ms to 0.5 ms, and >0.5 ms, the distribution information of the downlink transmission delay between the network device and the terminal device may be, for example, shown in the following Table 1:

TABLE 1

| Delay segment | Distribution information of the downlink transmission delay between the network device and the terminal device |
| --- | --- |
| <0.3 ms | 50% |
| 0.3 ms to 0.5 ms | 30% |
| >0.5 ms | 20% |

In another implementation, the distribution information of the downlink transmission delay may be a proportion of a delay that is less than, greater than, or equal to a threshold. The threshold may be communicated by the network device to the terminal device, or may be preset. For example, if the delay is less than a threshold 0.3 ms, the distribution information of the downlink transmission delay between the network device and the terminal device may be, for example, shown in the following Table 2:

TABLE 2

| Delay segment | Distribution information of the downlink transmission delay between the network device and the terminal device |
| --- | --- |
| <0.3 ms | 30% |
| ≥0.3 ms | 70% |

It should be understood that Table 1 and Table 2 shows the distribution information of the downlink transmission delay between the network device and the terminal device, but representation forms of the transmission delay distribution in this embodiment of this application include but are not limited to the two cases shown in Table 1 and Table 2.

S103: The network device sends second information to the first device within the first preset duration.

The second information is used to indicate the transmission delay measurement result.

The foregoing first preset duration is used to define an effective time of the transmission delay measurement result. In other words, the network device needs to report the transmission delay measurement result to the first device within the first preset duration. If the network device fails to obtain the transmission delay measurement result within the first preset duration, the network device may send third information to the first device. The third information is used to indicate a failure in measurement of the transmission delay between the network device and the terminal device.

In the foregoing manner, the network device can feed back the transmission delay measurement result to the first device in a timely manner.

In an implementation, after receiving the first information, the network device may start a timer. A value of duration of the timer may be the first preset duration. If the network device obtains the transmission delay measurement result before the timer expires, the network device sends, to the first device, the second information used to indicate the transmission delay measurement result. If the network device fails to obtain the transmission delay measurement result when the timer expires, the network device sends, to the first device, the third information used to indicate a failure in measurement of the transmission delay between the network device and the terminal device fails.

That the foregoing first device is the core network device and the first information is further used to measure the transmission delay between the core network device and the network device is used as an example. Because the network device and the terminal device communicate with each other through an air interface, if the network device and the terminal device measure the transmission delay between the network device and the terminal device by using a data packet, the data packet used to measure the transmission delay may be lost in wireless transmission. Consequently, the network device may be always waiting for a feedback from the terminal device, and cannot feed back the transmission delay measurement result to the first device. However, according to the method in this embodiment of this application, if the network device fails to obtain the transmission delay measurement result within the first preset duration, the network device may send the third information to the first device, so that the core network device can still learn of the transmission delay between the core network device and the network device in a timely manner by using the third information.

In this example, the foregoing third information may further carry a time at which the network device receives the first information and a time at which the network device sends the third information. Optionally, the packet header or the extension header of the GTP-U packet including the first information may further carry an identifier (for example, a serial number number), used to indicate a number of the currently sent first information. The network device may subsequently include the identifier in the second information or the third information sent to the core network device, so that the core network device learns of a time at which the core network device sends the first information. In this way, the core network device can accurately calculate the transmission delay between the core network device and the network device.

It should be understood that the foregoing first preset duration may be preset in the network device, may be communicated by the first device to the network device using the first information, or may be communicated by the first device to the network device using fourth information independent of the first information. That the first device is the core network device is used as an example. The core network device may indicate the first preset duration to the network device by including the fourth information in a control plane message. The control plane message herein may be, for example, a PDU session resource setup request, a PDU session resource modification request, an initial context setup request, a terminal device/UE context modification request (UE context modification request), a handover request, or a path switch request acknowledge.

Optionally, the foregoing first preset duration may be at a terminal device level. To be specific, when the transmission delay measurement is implemented between the network device and the terminal device by using any PDU, the first preset duration may be used to constrain the effective time of the transmission delay measurement result.

Alternatively, the foregoing first preset duration may be at a PDU session level. To be specific, when the transmission delay measurement is implemented between the network device and the terminal device by using any PDU corresponding to the PDU session, the first preset duration may be used to constrain the effective time of the transmission delay measurement result. In this scenario, for a PDU corresponding to another PDU session, first preset duration corresponding to the another PDU session is used to constrain the effective time of the transmission delay measurement result.

Alternatively, the foregoing first preset duration may be at a quality of service flow level. To be specific, when the transmission delay measurement is implemented between the network device and the terminal device by using any PDU corresponding to the quality of service flow, the first preset duration may be used to constrain the effective time of the transmission delay measurement result. In this scenario, for a PDU corresponding to another quality of service flow, first preset duration corresponding to the another quality of service flow is used to constrain the effective time of the transmission delay measurement result.

Alternatively, the foregoing first preset duration may be at a 5G quality of service identifier (5G QoS identifier, 5QI) level. To be specific, when the transmission delay measurement is implemented between the network device and the terminal device by using any PDU corresponding to the 5QI, the first preset duration may be used to constrain the effective time of the transmission delay measurement result. In this scenario, for a PDU corresponding to another 5QI, first preset duration corresponding to that 5QI is used to constrain the effective time of the transmission delay measurement result.

It should be understood that if the network device is in a CU-DU architecture, when a CU-CP of the network device receives the first preset duration or the second preset duration indicated by the first device, the CU-CP of the network device needs to notify the first preset duration or the second preset duration to a CU-UP that performs the transmission delay measurement.

According to the method provided in this embodiment of this application, the first device may trigger, by using the first information, the network device to measure the transmission delay between the network device and the terminal device. After receiving the first information, the network device may obtain the transmission delay measurement result in response to the first information, and feed back the transmission delay measurement result to the first device within the first preset duration by using the second information, to implement the transmission delay measurement between the network device and the terminal device in a 5G network. In addition, the first device may further learn of the transmission delay measurement result in a timely manner by using the first preset duration.

The following describes how the foregoing network device obtains the transmission delay measurement result by using an example in which the transmission delay between the network device and the terminal device includes an uplink transmission delay between the network device and the terminal device, and a measurement result of the uplink transmission delay is obtained by the network device by performing uplink transmission delay measurement with the terminal device after the network device receives the first information. The following two cases may be included.

Case 1: The first device is a core network device or a network management device. After the first device sends the first information to the network device to trigger the network device to measure the uplink transmission delay between the network device and the terminal device, the network device triggers the terminal device to perform the uplink transmission delay measurement. In this manner, the network device may trigger uplink delay measurement based on a requirement.

Figure 5:
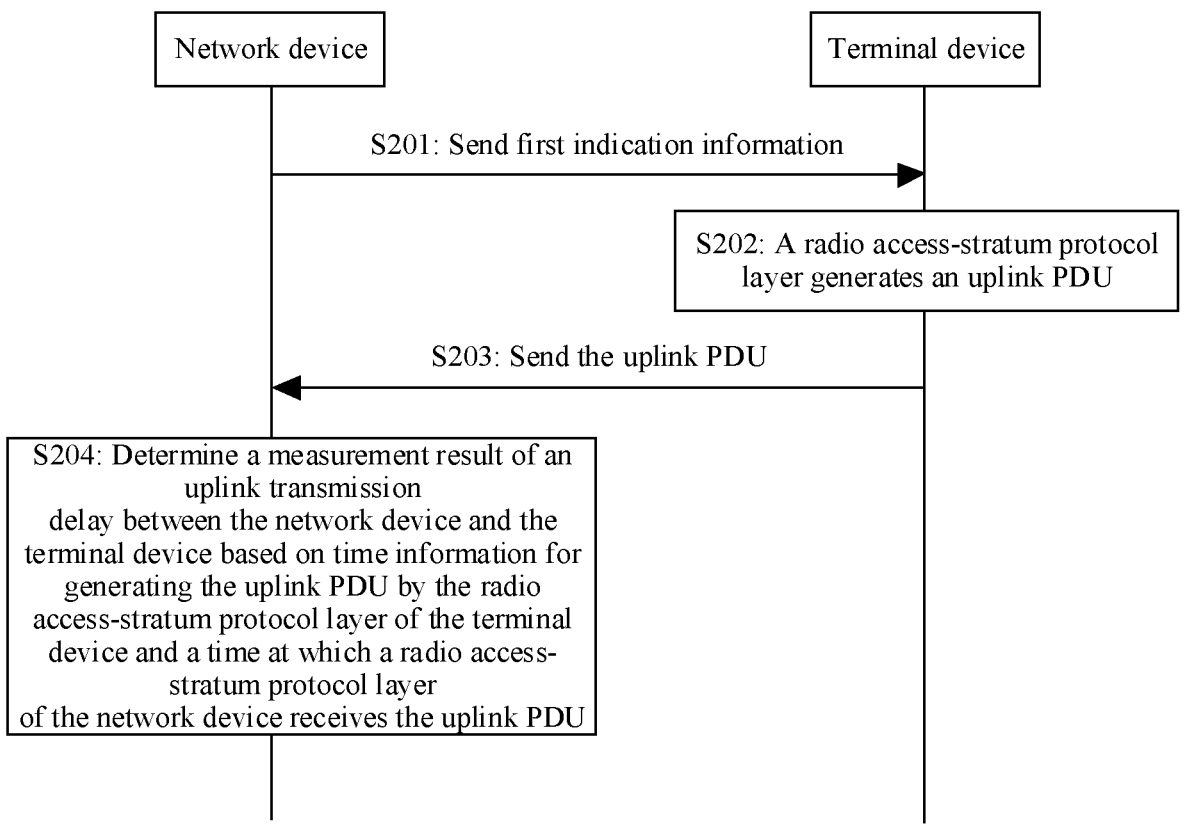
FIG. 5 is a schematic flowchart of another delay measurement method according to an embodiment of this application.

FIG. 5 is a schematic flowchart of another delay measurement method according to an embodiment of this application. As shown in FIG. 5, a network device may obtain an uplink transmission delay measurement result by using the following steps.

S201: The network device sends first indication information to a terminal device.

The first indication information is used to trigger the terminal device to perform uplink transmission delay measurement.

Subsequently, the terminal device receives the first information.

For example, the network device may send higher layer signaling to the terminal device, and the higher layer signaling includes the foregoing first indication information. The higher layer signaling herein may be, for example, radio resource control (RRC) signaling or MAC signaling.

For another example, the network device may send one or more downlink PDUs to the terminal device, and the foregoing first indication information is carried in the one or more downlink PDUs. The downlink PDU herein may be a downlink PDU generated by a radio access-stratum protocol layer of the network device, for example, an SDAP layer or a PDCP layer. The downlink PDU may be a downlink control PDU or a downlink data PDU.

When the downlink PDU is the downlink control PDU, the downlink control PDU may be an existing control PDU, and a field in the existing control PDU is used to carry the first indication information. The field may include at least one bit. The downlink control PDU may also be a new downlink control PDU, that is, a format of the downlink control PDU is different from a format of an existing downlink control PDU. The new downlink control PDU may be specially used to trigger the terminal device to perform the uplink transmission delay measurement. In other words, the first indication information is equivalent to the new downlink control PDU.

Optionally, when the downlink control PDU is a downlink control PDU generated by an SDAP layer of the network device, the downlink control PDU may further carry a quality of service flow identifier (QFI), to indicate the terminal device to perform the uplink delay measurement on an uplink PDU corresponding to a specific QFI.

When the downlink PDU is the downlink data PDU, the first indication information may be carried in a packet header of the downlink data PDU. Alternatively, the downlink data PDU carries other information (for example, time information) related to the uplink transmission delay measurement, to implicitly trigger, by using the information, the terminal device to perform the uplink transmission delay measurement. In this case, the information is the first indication information described above. It should be understood that the time information herein may be time information for generating the downlink data PDU by the radio access-stratum protocol layer of the network device or time information for receiving, by the radio access-stratum protocol layer of the network device, an SDU included in the downlink data PDU sent by a protocol layer upper than the radio access-stratum protocol layer.

S202: A radio access-stratum protocol layer of the terminal device generates an uplink PDU.

The uplink PDU may include time information for generating the uplink PDU by the radio access-stratum protocol layer of the terminal device. The time information herein may also be referred to as a timestamp.

Optionally, the uplink PDU may be an uplink control PDU or an uplink data PDU.

When the foregoing first indication information is sent by the network device to the terminal device by using at least one downlink control PDU, and the downlink control PDU further carries a QFI, the uplink PDU described herein may be an uplink PDU corresponding to the QFI.

S203: The terminal device sends the uplink PDU to the network device.

Subsequently, the network device receives the uplink PDU.

S204: The network device determines a measurement result of an uplink transmission delay between the network device and the terminal device based on the time information for generating the uplink PDU by the radio access-stratum protocol layer of the terminal device and a time at which the radio access-stratum protocol layer of the network device receives the uplink PDU.

Optionally, the uplink transmission delay measurement result is an uplink transmission delay value.

For example, the network device may subtract the time information for generating the uplink PDU by the radio access-stratum protocol layer of the terminal device from the time at which the radio access-stratum protocol layer of the network device receives the uplink PDU, to obtain the measurement result of the uplink transmission delay between the network device and the terminal device. Alternatively, the network device may subtract the time information for generating the uplink PDU by the radio access-stratum protocol layer of the terminal device from the time at which the radio access-stratum protocol layer of the network device receives the uplink PDU and divide a difference by a preset coefficient, to obtain the measurement result of the uplink transmission delay between the network device and the terminal device.

In another implementation, the uplink PDU may include an uplink SDU and time information for receiving the uplink SDU by the radio access-stratum protocol layer of the terminal device from a protocol layer upper than the radio access-stratum protocol layer. In this implementation, the foregoing step S204 may be replaced with the following step:

The network device determines a measurement result of an uplink transmission delay between the network device and the terminal device based on the time information for receiving the uplink SDU by the radio access-stratum protocol layer of the terminal device and a time at which the network device sends the uplink SDU to the upper-layer protocol layer of the radio access-stratum protocol layer.

For example, the network device may subtract the time information for receiving the uplink SDU by the radio access-stratum protocol layer of the terminal device from the time at which the radio access-stratum protocol layer of the network device sends the uplink SDU to the upper-layer of the radio access-stratum protocol layer, to obtain the measurement result of the uplink transmission delay between the network device and the terminal device. Alternatively, the network device may divide, by a preset coefficient, a value obtained by subtracting the time information for receiving the uplink SDU by the radio access-stratum protocol layer of the terminal device from the time at which the radio access-stratum protocol layer of the network device sends the uplink SDU to the upper-layer of the radio access-stratum protocol layer, to obtain the measurement result of the uplink transmission delay between the network device and the terminal device.

It can be learned from the foregoing manner that, a manner of measuring the uplink transmission delay by the terminal device is to include, in the uplink PDU, the time information for generating the uplink PDU by the radio access-stratum protocol layer of the terminal device, or the time information for receiving the uplink SDU by the radio access-stratum protocol layer of the terminal device from the upper-layer protocol layer of the radio access-stratum protocol layer. Therefore, in some embodiments, the foregoing first indication information may alternatively be replaced with indication information used to trigger the terminal device to include time information in the uplink PDU.

In an implementation, the foregoing terminal device may perform the uplink transmission delay measurement within third preset duration. To be specific, if the terminal device generates the uplink PDU within the third preset duration that is after the terminal device receives the first indication information sent by the network device, the terminal device adds, to the uplink PDU, the time information for generating the uplink PDU by the radio access-stratum protocol layer of the terminal device, or the time information for receiving the uplink SDU by the radio access-stratum protocol layer of the terminal device from the upper-layer protocol layer of the radio access-stratum protocol layer. If the terminal device does not generate the uplink PDU within the third preset duration, even if another uplink PDU is generated subsequently, the terminal device no longer adds time information to the uplink PDU. It should be understood that the foregoing third preset duration may be less than the first preset duration. In this manner, the uplink transmission delay measurement between the terminal device and the network device may be constrained to be completed within the first preset duration as much as possible. In addition, the network device may trigger the uplink delay measurement based on a requirement, and the network device does not need to deliver configuration information of corresponding uplink transmission delay measurement to the terminal device.

It should be understood that the foregoing third preset duration may be preset in the terminal device, or may be indicated by the network device to the terminal device by using the first indication information. In other words, the first indication information is specifically used to trigger the terminal device to perform the uplink transmission delay measurement within the third preset duration. Alternatively, the foregoing third preset duration may be sent by the network device to the terminal device by using other indication information. This is not limited.

It should be understood that an example in which the first device requests, by using the first information, the network device to measure the uplink transmission delay between the network device and the terminal device is used in this embodiment to describe how the network device triggers the terminal device to perform the uplink transmission delay measurement and how the terminal device performs the uplink transmission delay measurement. However, the implementations of this embodiment may not depend on the foregoing embodiment. To be specific, regardless of how a core network device triggers the network device to measure the uplink transmission delay between the network device and the terminal device, the network device and the terminal device may implement the uplink transmission delay measurement in a manner of this embodiment.

Case 2: The first device is a core network device. When the core network device sends the first information to the network device to trigger the network device to measure the uplink transmission delay between the network device and the terminal device, the core network device triggers the terminal device to perform the uplink transmission delay measurement by using a non-access-stratum message (for example, a session establishment or modification message). In this embodiment, an upper-layer protocol layer of a radio access network protocol layer or a radio air interface protocol layer of the terminal device determines when to perform the uplink delay measurement.

Figure 6:
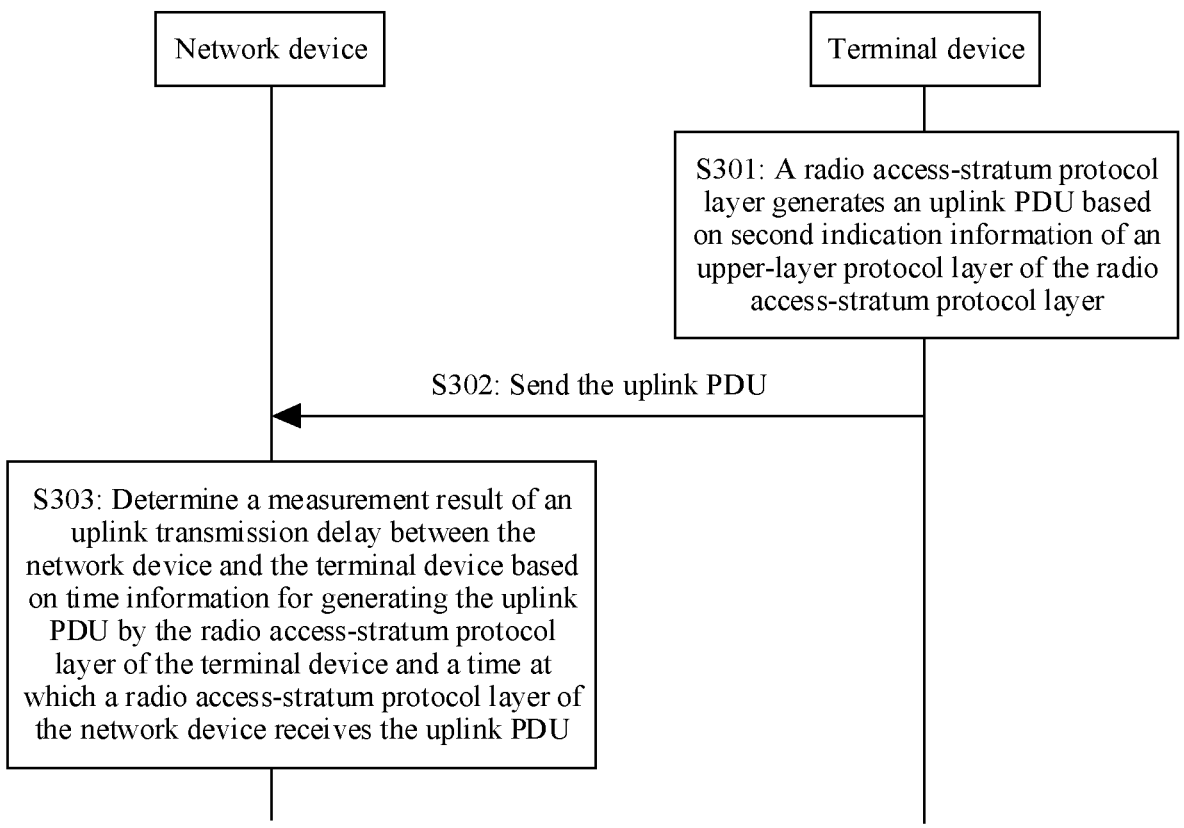
FIG. 6 is a schematic flowchart of still another delay measurement method according to an embodiment of this application.

FIG. 6 is a schematic flowchart of another delay measurement method according to an embodiment of this application. As shown in FIG. 6, a network device may obtain an uplink transmission delay measurement result by using the following steps.

S301: A radio access-stratum protocol layer of a terminal device generates an uplink PDU based on second indication information of a protocol layer upper than the radio access-stratum protocol layer.

The uplink PDU includes time information for generating the uplink PDU by the radio access-stratum protocol layer of the terminal device, and the second indication information is used to indicate to perform uplink transmission delay measurement on the uplink PDU. The radio access-stratum protocol layer may be a protocol layer in an SDAP layer, a PDCP layer, and the like. A protocol layer upper than a radio access stratum protocol layer or a protocol layer upper than a radio air interface protocol layer may be a radio non-access stratum protocol layer (for example, a non-access-stratum protocol layer), an application layer, or another protocol layer.

In this embodiment, the upper-layer protocol layer of the terminal device samples a data packet, and then the upper-layer protocol layer notifies, by using the second indication information, that the uplink delay measurement needs to be performed on an SDU corresponding to the radio access-stratum protocol layer of the terminal device. Optionally, the foregoing second indication information may be carried in an SDU that is sent by the upper-layer protocol layer to the radio access-stratum protocol layer, that is, an SDU received by the radio access-stratum protocol layer of the terminal device. Optionally, the foregoing second indication information may be separately sent to the radio access-stratum protocol layer or the radio air interface protocol layer, that is, the radio access-stratum protocol layer or the radio air interface protocol layer receives the second indication information and the SDU from the upper-layer protocol layer, and the second indication information is not carried in the SDU.

In a possible implementation, the terminal device may further receive third indication information from a core network device. The third indication information is used to indicate an identifier of a service for performing the uplink transmission delay measurement, and in this implementation, the foregoing uplink PDU is an uplink PDU of a service corresponding to the identifier of the service. The identifier of the service for performing the uplink transmission delay measurement herein may be, for example, an identifier of a PDU session, an identifier of a quality of service flow, or an evolved universal terrestrial radio access network bearer (E-RAB).

It should be understood that the radio access-stratum protocol layer of the terminal device that receives the second indication information may be the same as the radio access-stratum protocol layer of the terminal device that generates the uplink PDU. For example, the radio access-stratum protocol layer may be the SDAP layer. Alternatively, the radio access-stratum protocol layer of the terminal device that receives the second indication information may be different from the radio access-stratum protocol layer of the terminal device that generates the uplink PDU. For example, the radio access-stratum protocol layer of the terminal device that receives the second indication information is the SDAP layer, and the radio access-stratum protocol layer of the terminal device that generates the uplink PDU is the PDCP layer.

S302: The terminal device sends the uplink PDU to the network device.

Subsequently, the network device receives the uplink PDU.

S303: The network device determines a measurement result of an uplink transmission delay between the network device and the terminal device based on the time information for generating the uplink PDU by the radio access-stratum protocol layer of the terminal device and a time at which a radio access-stratum protocol layer of the network device receives the uplink PDU.

Optionally, the uplink transmission delay measurement result is an uplink transmission delay value.

In another implementation, the uplink PDU may include an uplink SDU and time information for receiving the uplink SDU by the radio access-stratum protocol layer of the terminal device from the upper-layer protocol layer of the radio access-stratum protocol layer. In this implementation, the foregoing step S303 may be replaced with the following step:

The network device determines a measurement result of an uplink transmission delay between the network device and the terminal device based on the time information for receiving the uplink SDU by the radio access-stratum protocol layer of the terminal device and a time at which a radio access-stratum protocol layer of the network device sends the uplink SDU to a protocol layer upper than the radio access-stratum protocol layer.

For how the network device determines the measurement result of the uplink transmission delay between the network device and the terminal device, refer to the foregoing description of S204. Details are not described herein again.

In a possible implementation, in this embodiment, the uplink PDU may further include fifth information. The fifth information is used to indicate that the uplink PDU carries the time information for generating the uplink PDU by the radio access-stratum protocol layer of the terminal device or the time information for receiving the uplink SDU by the radio access-stratum protocol layer of the terminal device. In this way, after receiving the uplink PDU, the network device may learn in a timely manner that the uplink PDU carries the time information for generating the uplink PDU by the radio access-stratum protocol layer of the terminal device or the time information for receiving the uplink SDU by the radio access-stratum protocol layer of the terminal device, so that the network device can determine the measurement result of the uplink transmission delay between the network device and the terminal device based on the carried time information. Optionally, the fifth information may be the second indication information described above, or may be information defined by the radio access-stratum protocol layer. This is not limited.

In the foregoing manners, the uplink transmission delay measurement between the network device and the terminal device may be implemented. For downlink transmission delay measurement between the network device and the terminal device, refer to an implementation in the conventional technology. Details are not described herein.

The foregoing two manners describe a manner in which the terminal device adds, to the sent uplink PDU, the time information for generating the uplink PDU by the radio access-stratum protocol layer of the terminal device, or the time information for receiving the uplink SDU by the radio access-stratum protocol layer of the terminal device, to implement uplink transmission delay measurement between the network device and the terminal device. However, in another implementation, the foregoing time information carried by the terminal device may be a time offset relative to a time reference point. For example, the network device notifies the terminal device of a rule of a moment corresponding to a time reference point (for example, notifies the terminal device by using an RRC message). For example, (10*SFN+subframe) MOD period=0, that is, a frame number SFN and a subframe number subframe and a reference period meet a specific rule. Alternatively, the network device directly notifies the terminal device of a start time and a reference period corresponding to a time reference point (for example, notifies the terminal device by using an RRC message).

The time information carries the time offset, therefore, when the network device receives the uplink PDU sent by the terminal device, the network device may not know a specific time reference point relative to the time information carried in the uplink PDU. A cause of this problem is, for example, a period of time between a time at which the terminal device adds the time information to the uplink PDU and a time at which the terminal device sends the uplink PDU to the network device, or that the network device may not correctly parse out the uplink PDU when receiving the uplink PDU sent by the terminal device for a first time.

Figure 6A:
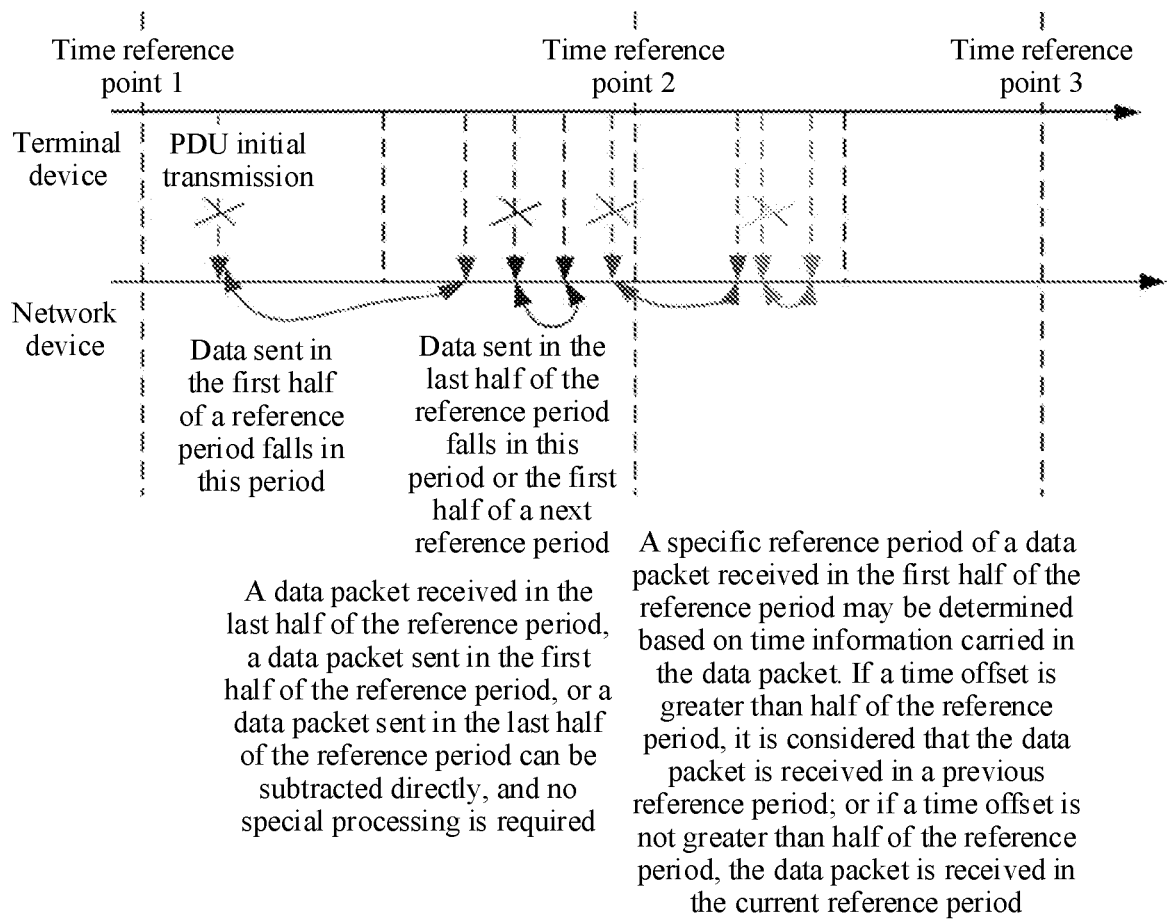
FIG. 6A is a schematic diagram of PDU sending according to an embodiment of this application.

FIG. 6A is a schematic diagram of PDU sending according to an embodiment of this application. As shown in FIG. 6A, an example in which a data packet is an uplink PDU is used. To resolve the foregoing problem, a network device may determine an uplink transmission delay measurement result between the network device and a terminal device in following manners.

Manner 1: It is specified that a length of a reference period is greater than or equal to twice a maximum delay value.

In this implementation, for a latter half part of the reference period (that is, a moment after period/2 of a start point of the reference period), it may be considered that a sending moment and a receiving moment of the uplink PDU correspond to a same time reference point. Therefore, the network device may subtract a time offset 2 carried in a received uplink PDU from a time offset 1 of a moment at which the uplink PDU is received relative to a time reference point corresponding to the moment, to obtain the measurement result of the uplink transmission delay between the network device and the terminal device. The moment at which the network device receives the uplink PDU may be any moment from a moment at which a user plane entity of the network device receives the uplink PDU to a moment at which the user plane entity submits the uplink PDU to a higher layer.

For a first half part of the reference period (that is, a moment between the start point of the reference period and period/2 after the start point), the network device needs to perform the following determining.

It is assumed that a time offset of the moment at which the network device receives the uplink PDU relative to the time reference point corresponding to the moment is the offset 1, and a time offset carried in the received uplink PDU is the offset 2.

If the offset 1 is greater than the offset 2, the network device may determine that the measurement result of the uplink transmission delay between the network device and the terminal device is a difference between the offset 1 and the offset 2.

If the offset 1 is less than or equal to the offset 2, the delay is offset 1+period−offset 2. The period mentioned here is the reference period.

Manner 2: In addition to a time offset, the terminal device further carries time reference point indication information, and the indication information indicates a time reference point to which the time offset is relative. For example, one bit is used for indication. For example, when the bit is 0, it indicates that the time reference point is an odd-numbered time reference point, and when the bit is 1, it indicates that the time reference point is an even-numbered time reference point. Alternatively, when the bit is 1, it indicates that the time reference point is an odd-numbered time reference point, and when the bit is 0, it indicates that the time reference point is an even-numbered time reference point.

For the foregoing odd-numbered time reference point or the even-numbered time reference point, a first time reference point is a first time reference point that meets a corresponding rule after the network device notifies the terminal device related configuration for performing delay measurement, for example, a first time reference point that meets (10*SFN+subframe) MOD period=0 described above, and subsequent time points that meet to condition are successively a 2nd, 3rd, . . . , and $n^{th}$ time reference point. According to the rule, which time reference points are odd-numbered time points, and which time reference points are even-numbered time points are specified. In this way, the network device learns, based on the time offset carried in the uplink PDU and the indication information of the time reference point, a moment at which the terminal device sends the uplink PDU. Further, the network device obtains the measurement result of the uplink transmission delay between the network device and the terminal device by subtracting the moment at which the terminal device sends the uplink PDU from the moment at which the uplink PDU is received.

For example, an offset of the moment at which the network device receives the uplink PDU relative to a time reference point of the network device is an offset 1, and the time offset carried in the uplink PDU is an offset 2. If both the time reference point corresponding to the moment at which the network device receives the uplink PDU and the time reference point carried in the uplink PDU are even-numbered time reference points or odd-numbered time reference points, the network device may determine that the measurement result of the uplink transmission delay between the network device and the terminal device is offset 1−offset 2. It should be understood that a maximum delay of a network in this embodiment should be less than the reference period. Therefore, if both the time reference point corresponding to the moment at which the network device receives the uplink PDU and the time reference point carried in the uplink PDU are even-numbered time reference points or odd-numbered time reference points, it indicates that a same time reference point is corresponded.

If one of the time reference point corresponding to the moment at which the network device receives the uplink PDU and the time reference point carried in the uplink PDU is an even-numbered time reference point, and the other is an odd-numbered time reference point, the network device may determine that the measurement result of the uplink transmission delay between the network device and the terminal device is offset 1+period−offset 2. It should be understood that the maximum delay of the network in this embodiment should be less than the reference period. Therefore, if one of the time reference point corresponding to the moment at which the network device receives the uplink PDU and the time reference point carried in the uplink PDU is an even-numbered time reference point, and the other is an odd-numbered time reference point, it indicates that the two time reference points differ by one reference period.

In the foregoing manner, when receiving the uplink PDU sent by the terminal device, the network device may accurately learn that carried time information corresponds to which time reference point, so that the network device may accurately learn of the measurement result of the uplink transmission delay between the network device and the terminal device.

It should be understood that in the foregoing embodiment, how the network device learns of the measurement result of the uplink transmission delay between the network device and the terminal device based on the time offset carried by the terminal device is used as an example is described. However, a person skilled in the art may understand that when the foregoing network device sends, to the terminal device in the foregoing manner, a downlink PDU carrying a time offset, to perform downlink transmission delay measurement, the terminal device may also learn of a downlink transmission delay measurement result between the network device and the terminal device in the foregoing manner. An implementation is similar, and details are not described herein again.

It should be understood that in this embodiment, an example in which a first device requests, by using first information, the network device to measure a transmission delay between the network device and the terminal device is used to describe how the terminal device performs transmission delay measurement. However, an implementation of this embodiment may not depend on the foregoing embodiment. To be specific, regardless of which manner is used to trigger the network device and the terminal device to perform the transmission delay measurement, the manner of this embodiment may be used to implement the uplink transmission delay measurement.

In another implementation, when the first device triggers the network device to measure the transmission delay between the network device and the terminal device, the network device may also obtain a transmission delay measurement result between the network device and the terminal device in the following manner.

A receive end and a transmit end themselves calculate a delay of processing a PDU on a side of the receive end and a delay of processing a PDU on a side of the transmit end, and then a network device side adds the processing delays of the transmit end and the receive end together. When the receive end herein is the network device, the transmit end may be the terminal device, or the receive end is the terminal device and the transmit end is the network device.

For a downlink transmission delay, because in wireless communication, a data packet may be segmented into a plurality of segments at an RLC/MAC layer, the network device collects statistics about a delay between a moment at which an SDAP layer of the network device receives the data packet (SDAP SDU) from a core network device or a moment at which a PDCP layer of the network device receives the data packet (PDCP SDU) from an upper protocol layer and a moment at which a last segment of the data packet (that is, an SDAP SDU or a PDCP SDU) is correctly received by the terminal device (learned based on HARQ information fed back by the terminal device). It should be understood that the last segment herein is actually a segment that is in all segments and that is lastly and correctly received by the terminal device.

A terminal device side collects statistics about a delay between a moment at which the last segment of the SDU is correctly received by the terminal device and a moment at which an SDAP layer or a PDCP layer of the terminal device submits the SDU to an upper layer.

For an uplink transmission delay, the terminal device collects statistics about a delay between a moment at which the SDAP layer or the PDCP layer of the terminal device receives the data packet (the SDAP SDU or the PDCP SDU) from the upper layer and a moment at which new data is scheduled by the network device in a HARQ process at a MAC layer corresponding to the last segment of the data packet (in other words, a moment at which a MAC layer of the terminal device clears the last segment of the data packet from a buffer in the HARQ process).

The network device side collects statistics about a delay between a moment at which the network device schedules other new data in the HARQ process to which the last segment of the data packet belongs and a moment at which the PDCP layer or the SDAP layer of the network device submits the data packet to an upper layer.

After the terminal device collects statistics about processing time of an uplink data packet or a downlink data packet on the terminal device side, the terminal device notifies the network device of a corresponding result. The terminal device may feed back delay information corresponding to each data packet, or may feed back an average delay value or delay distribution of a DRB, a QoS flow, or a PDU session. In this way, the network device may calculate an entire downlink or uplink delay based on a delay fed back by the terminal device and a delay obtained through internal statistics collection by the network device.

In this manner, there is no need to include time information in a PDU between the terminal device and the network device, to perform the transmission delay measurement. This can reduce air interface overheads while implementing the transmission delay measurement.

It should be understood that in this embodiment, an example in which the first device requests, by using the first information, the network device to measure the transmission delay between the network device and the terminal device is used to describe how the terminal device performs the transmission delay measurement. However, an implementation of this embodiment may not depend on the foregoing embodiment. To be specific, regardless of which manner is used to trigger the network device and the terminal device to perform the transmission delay measurement, the manner of this embodiment may be used to implement the uplink transmission delay measurement.

As described in the foregoing embodiment, the foregoing first device described above may be any device that needs to measure the transmission delay between the network device and the terminal device, for example, a network management device or the core network device. A network management device and a core network device are used as an example. In some embodiments, for the downlink transmission delay between the network device and the terminal device, the network management device may need to learn of distribution information of the downlink transmission delay between the network device and the terminal device, and the core network device may need to learn of a value of the downlink transmission delay between the network device and the terminal device.

It is assumed that after the network device receives the first information, the network device side stores the distribution information of the downlink transmission delay between the network device and the terminal device obtained by the network device from the terminal device within second preset duration that is before the network device receives the first information (for example, the network device reports the distribution information of the downlink transmission delay between the network device and the terminal device to the network management device within the second preset duration before the network device receives the first information). In this case, the network device may determine the downlink transmission delay value between the network device and the terminal device based on the distribution information of the downlink transmission delay between the network device and the terminal device.

Distribution information of the downlink transmission delay shown in Table 1 is used as an example. In this case, the network device may determine that the value of the downlink transmission delay between the network device and the terminal device is 0.3*50%+0.4*30%+0.5*20%.

Distribution information of the downlink transmission delay shown in Table 2 is used as an example. In this case, the network device may determine the value of the downlink transmission delay between the network device and the terminal device based on the distribution information of the downlink transmission delay and a maximum delay (that is, a maximum delay value range, for example, a value specified in a protocol or a length specified by a length of a timer delivered by the core network device). For example, the value of the downlink transmission delay between the network device and the terminal device may be 0.3*30%+(0.3+Time)/2*(1−30%), where Time is the maximum delay.

In this manner, a requirement that both the network management device and the core network device may want to obtain a transmission delay is unified, that is, a same mechanism may be used between the terminal device and the network device to perform the transmission delay measurement, thereby reducing complexity of network configuration.

It should be understood that the foregoing two examples are merely examples, and do not constitute a limitation on how the network device determines the value of the downlink transmission delay between the network device and the terminal device based on the distribution information of the downlink transmission delay between the network device and the terminal device. The network device may determine the value of the downlink transmission delay between the network device and the terminal device in another manner based on the distribution information of the downlink transmission delay between the network device and the terminal device. Details are not described herein again.

The foregoing embodiment describes how the network device obtains the measurement result of the uplink transmission delay between the network device and the terminal device. The following describes how the terminal device obtains the measurement result of the uplink transmission delay between the network device and the terminal device. For example, the following implementations may be included.

Manner 1: The network device notifies the terminal device.

Specifically, the network device sends sixth information to the terminal device. The sixth information is used to indicate the measurement result of the uplink transmission delay between the network device and the terminal device. Correspondingly, the terminal device receives the sixth information.

For example, after obtaining the measurement result of the uplink transmission delay between the network device and the terminal device, the network device may include the sixth information in higher layer signaling, to notify the terminal device of the measurement result of the uplink transmission delay between the network device and the terminal device. Alternatively, the network device sends the sixth information to the terminal device through a user plane, to notify the terminal device of the measurement result of the uplink transmission delay between the network device and the terminal device. For example, a radio access-stratum protocol layer of the network device may generate a downlink PDU, and the downlink PDU carries the measurement result of the uplink transmission delay between the network device and the terminal device. The downlink PDU may be a downlink control PDU or a downlink data PDU.

It should be understood that the measurement result of the uplink transmission delay between the network device and the terminal device herein may be an uplink transmission delay measurement value between the network device and the terminal device, or may be uplink transmission delay measurement distribution information. The uplink transmission delay measurement distribution information may be obtained by the network device through statistics collection based on an uplink transmission delay measurement value between the network device and the terminal device that is obtained within a time period.

Optionally, if the foregoing uplink transmission delay measurement result between the network device and the terminal device is an uplink transmission delay measurement result obtained by measuring a service, the foregoing sixth information may further carry an identifier of the service, for example, an identifier of a PDU session, an identifier of a quality of service flow, or an E-RAB.

It should be noted that, although how the network device notifies the terminal device of the measurement result of the uplink transmission delay between the network device and the terminal device is described in this embodiment based on the foregoing embodiment, a person skilled in the art should understand that the foregoing manner of notifying the terminal device of the measurement result of the uplink transmission delay between the network device and the terminal device may not depend on the foregoing embodiment. In other words, regardless of how the network device obtains the measurement result of the uplink transmission delay between the network device and the terminal device, the network device may notify the terminal device of the measurement result of the uplink transmission delay between the network device and the terminal device in the manner in this embodiment.

Manner 2: The network device sends the measurement result of the uplink transmission delay between the network device and the terminal device to the first device, and the first device notifies the terminal device of the measurement result of the uplink transmission delay between the network device and the terminal device.

Specifically, the first device may send sixth information to the terminal device. The sixth information is used to indicate the measurement result of the uplink transmission delay between the network device and the terminal device. Correspondingly, the terminal device receives the sixth information.

That the first device is the core network device is used as an example. The core network device may include the sixth information in a non-access-stratum message or a service data packet, to notify the terminal device of the measurement result of the uplink transmission delay between the network device and the terminal device. Optionally, in this implementation, the core network device may further indicate a transmission delay between the core network device and the terminal device and/or a transmission delay between the core network device and the network device by using the sixth information.

In a possible implementation, when the foregoing first device is a core network device, the core network device may further send seventh information to the network device after obtaining the measurement result of the transmission delay between the core network device and the terminal device and/or the measurement result of the transmission delay between the core network device and the network device. The seventh information is used to indicate the measurement result of the transmission delay between the core network device and the terminal device, and/or the measurement result of the transmission delay between the core network device and the network device.

After receiving the seventh information, the network device may send the seventh information to the terminal device, so that the terminal device can learn of the measurement result of the transmission delay between the core network device and the terminal device and/or the measurement result of the transmission delay between the core network device and the network device by using the seventh information.

It should be understood that the measurement result of the uplink transmission delay between the network device and the terminal device described herein in this embodiment may be the uplink transmission delay measurement value between the network device and the terminal device, or may be the uplink transmission delay measurement distribution information. The uplink transmission delay measurement distribution information may be obtained by the network device through statistics collection based on the uplink transmission delay measurement value between the network device and the terminal device that is obtained within a time period.

It should be noted that, although how the first device notifies the terminal device of the transmission delay measurement result is described in this embodiment based on the foregoing embodiment, a person skilled in the art may understand that the foregoing manner of notifying the terminal device of the transmission delay measurement result may not depend on the foregoing embodiment. In other words, regardless of how the first device obtains the transmission delay measurement result, the first device may notify the terminal device of the transmission delay measurement result in the manner in this embodiment.

In the foregoing manner, the terminal device may learn of the measurement result of the uplink transmission delay between the network device and the terminal device in a timely manner.

Figure 7:
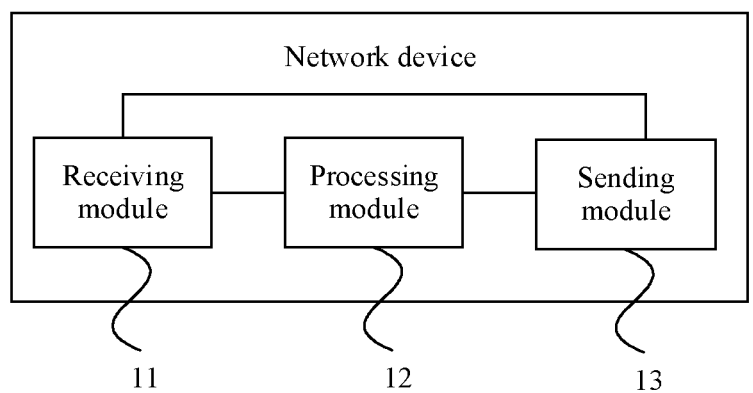
FIG. 7 is a schematic structural diagram of a network device according to an embodiment of this application.

FIG. 7 is a schematic structural diagram of a network device according to an embodiment of this application. As shown in FIG. 7, the network device may include a receiving module 11, a processing module 12, and a sending module 13.

The receiving module 11 is configured to receive first information sent by a first device, where the first information is used to request the network device to measure a transmission delay between the network device and a terminal device.

The processing module 12 is configured to obtain a transmission delay measurement result in response to the first information. In a possible implementation, the transmission delay measurement result is obtained through measurement between the network device and the terminal device after the network device receives the first information. Alternatively, the transmission delay measurement result is obtained by the network device within second preset duration that is before the network device receives the first information.

The sending module 13 is configured to send second information to the first device within first preset duration, where the second information is used to indicate the transmission delay measurement result.

In an implementation, the sending module 13 is further configured to: when the transmission delay measurement result fails to be obtained within the first preset duration, send third information to the first device. The third information is used to indicate a failure in measurement of the transmission delay between the network device and the terminal device.

In an implementation, the receiving module 11 is further configured to receive fourth information from the first device. The fourth information is used to indicate the first preset duration.

When the transmission delay between the network device and the terminal device includes an uplink transmission delay between the network device and the terminal device, the receiving module 11 is further configured to receive an uplink PDU from the terminal device, where the uplink PDU includes time information for generating the uplink PDU by a radio access-stratum protocol layer of the terminal device. The processing module 12 is configured to determine a measurement result of an uplink transmission delay between the network device and the terminal device based on the time information for generating the uplink PDU by the radio access-stratum protocol layer of the terminal device and a time at which a radio access-stratum protocol layer of the network device receives the uplink PDU. Alternatively, the receiving module 11 is further configured to receive an uplink PDU from the terminal device, where the uplink PDU includes an uplink SDU and time information for receiving the uplink SDU by a radio access-stratum protocol layer of the terminal device. The processing module 12 is configured to determine a measurement result of an uplink transmission delay between the network device and the terminal device based on the time information for receiving the uplink SDU by the radio access-stratum protocol layer of the terminal device and a time at which a radio access-stratum protocol layer of the network device sends the uplink SDU to a protocol layer upper than the radio access-stratum protocol layer.

In this implementation, when the terminal device is triggered by the network device to perform the uplink transmission delay measurement, in a possible implementation, the sending module 13 is further configured to: before the processing module 12 obtains the transmission delay measurement result, send first indication information to the terminal device. The first indication information is used to trigger the terminal device to perform the uplink transmission delay measurement. For example, the sending module 13 is configured to send one or more downlink protocol data units PDUs to the terminal device. The first indication information is carried in the one or more downlink PDUs. In some embodiments, the first indication information is specifically used to trigger the terminal device to perform the uplink transmission delay measurement within third preset duration.

When the terminal device is triggered by a core network device to perform the foregoing uplink transmission delay measurement, the uplink PDU may further include fifth information. The fifth information is used to indicate that the uplink PDU carries the time information for generating the uplink PDU by the radio access-stratum protocol layer of the terminal device or the time information for receiving the uplink SDU by the radio access-stratum protocol layer of the terminal device.

In an implementation, the sending module 13 is further configured to send sixth information to the terminal device. The sixth information is used to indicate the measurement result of the uplink transmission delay between the network device and the terminal device.

When the transmission delay between the network device and the terminal device includes a downlink transmission delay between the network device and the terminal device, and transmission delay measurement result is a value of the downlink transmission delay, the processing module 12 is configured to determine a value of the downlink transmission delay between the network device and the terminal device based on distribution information of the downlink transmission delay between the network device and the terminal device, where distribution information of the downlink transmission delay is reported by the terminal device to the network device within the second preset duration.

In an implementation, the first device is the core network device; the receiving module 11 is further configured to receive seventh information from the core network device. The seventh information is used to indicate a measurement result of a transmission delay between the core network device and the terminal device and/or a measurement result of a transmission delay between the core network device and the network device; and the sending module 13 is further configured to send the seventh information to the terminal device.

The network device provided in this embodiment of this application may perform the actions of the network device in the foregoing method embodiments. Implementation principles and technical effects thereof are similar. Details are not described herein again.

Figure 8:
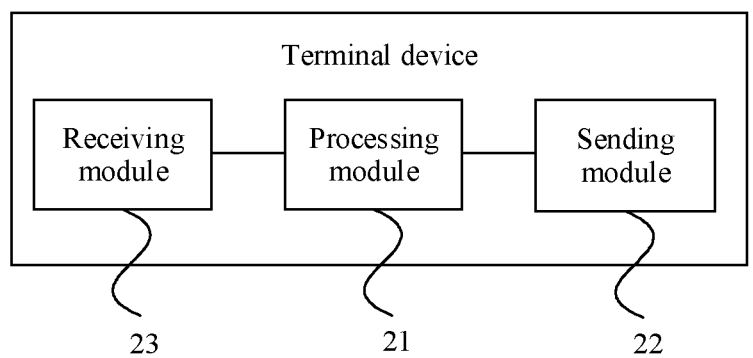
FIG. 8 is a schematic structural diagram of a terminal device according to an embodiment of this application.

FIG. 8 is a schematic structural diagram of a terminal device according to an embodiment of this application. As shown in FIG. 8, the terminal device may include a processing module 21 and a sending module 22. Optionally, the terminal device may further include a receiving module 23.

The processing module 21 is configured to generate an uplink PDU at a radio access-stratum protocol layer based on second indication information of a protocol layer upper than the radio access-stratum protocol layer. The uplink PDU includes time information for generating the uplink PDU by a radio access-stratum protocol layer of the terminal device, or the uplink PDU includes an uplink SDU and time information for receiving the uplink SDU by a radio access-stratum protocol layer of the terminal device. The second indication information is used to indicate to perform uplink transmission delay measurement on the uplink PDU.

The sending module 22 is configured to send the uplink PDU to a network device.

In an implementation, the uplink PDU further includes fifth information. The fifth information is used to indicate that the uplink PDU carries the time information for generating the uplink PDU by the radio access-stratum protocol layer of the terminal device or the time information for receiving the uplink SDU by the radio access-stratum protocol layer of the terminal device.

In an implementation, the receiving module 23 is configured to receive third indication information from a core network device. The third indication information is used to indicate an identifier of a service for performing the uplink transmission delay measurement, and the uplink PDU is an uplink PDU of a service corresponding to the identifier of the service.

In an implementation, the receiving module 23 is configured to receive sixth information from the network device or a first device. The sixth information is used to indicate a measurement result of an uplink transmission delay between the network device and the terminal device.

In an implementation, the receiving module 23 is configured to receive seventh information from the network device. The seventh information is used to indicate a measurement result of a transmission delay between the core network device and the terminal device and/or a measurement result of a transmission delay between the core network device and the network device.

The terminal device provided in this embodiment of this application may perform the actions of the terminal device in the foregoing method embodiments. Implementation principles and technical effects thereof are similar. Details are not described herein again.

It should be noted that the sending module may be a transmitter in an actual implementation, and the receiving module may be a receiver in an actual implementation. The processing module may be implemented in a form of software invoked by a processing element, or may be implemented in a form of hardware. For example, the processing module may be an independently disposed processing element, or may be integrated into a chip of the foregoing device for implementation. In addition, the processing module may be stored in a memory of the foregoing device in a form of program code, and invoked by a processing element of the foregoing device to perform the functions of the processing module. In addition, all or some of the modules may be integrated together, or may be implemented independently. The processing element may be an integrated circuit and has a signal processing capability. In an implementation process, steps in the foregoing methods or the foregoing modules can be implemented by using a hardware integrated logical circuit in the processing element, or by using instructions in a form of software.

For example, the foregoing modules may be configured as one or more integrated circuits for implementing the foregoing method, such as one or more application-specific integrated circuits ASICs), one or more microprocessors (such as one or more digital signal processors, (DSPs)), or one or more field programmable gate arrays (FPGAs). As another example, when one of the foregoing modules is implemented in a form of scheduling program code by a processing element, the processing element may be a general-purpose processor, for example, a central processing unit (CPU) or another processor that can invoke the program code. As another example, the modules may be integrated together and implemented in a form of a system-on-a-chip (SOC).

Figure 9:
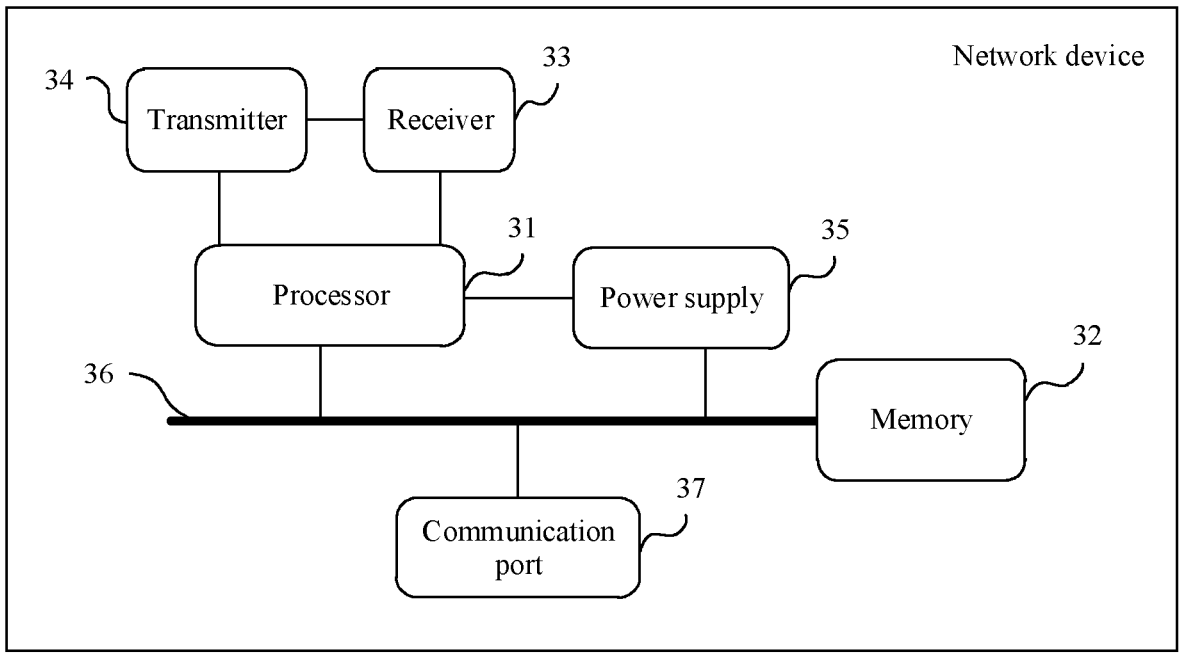
FIG. 9 is a schematic structural diagram of another network device according to an embodiment of this application.

FIG. 9 is a schematic structural diagram of another network device according to an embodiment of this application. As shown in FIG. 9, the network device may include a processor 31 (for example, a CPU), a memory 32, a receiver 33, and a transmitter 34. The receiver 33 and the transmitter 34 both are coupled to the processor 31, the processor 31 controls a receiving action of the receiver 33, and the processor 31 controls a sending action of the transmitter 34. The memory 32 may include a high-speed random access memory (RAM), and may further include a non-volatile memory (NVM), for example, at least one magnetic disk storage. The memory 32 may store various instructions, to complete various processing functions and implement method steps in this application. Optionally, the network device in this application may further include a power supply 35, a communication bus 36, and a communication port 37. The receiver 33 and the transmitter 34 may be integrated into a transceiver of the network device, or may be independent transceiver antennas of the network device. The communication bus 36 is configured to implement communication connection between components. The communication port 37 is configured to implement connection and communication between the network device and another peripheral.

In this embodiment of this application, the memory 32 is configured to store computer-executable program code, and the program code includes instructions. When the processor 31 executes the instructions, by using the instructions, the processor 31 of the network device is enabled to perform a processing action of the network device in the foregoing method embodiments, the receiver 33 is enabled to perform a receiving action of the network device in the foregoing method embodiments, and the transmitter 34 is enabled to perform a sending action of the network device in the foregoing method embodiments. Implementation principles and technical effects thereof are similar. Details are not described herein again.

Figure 10:
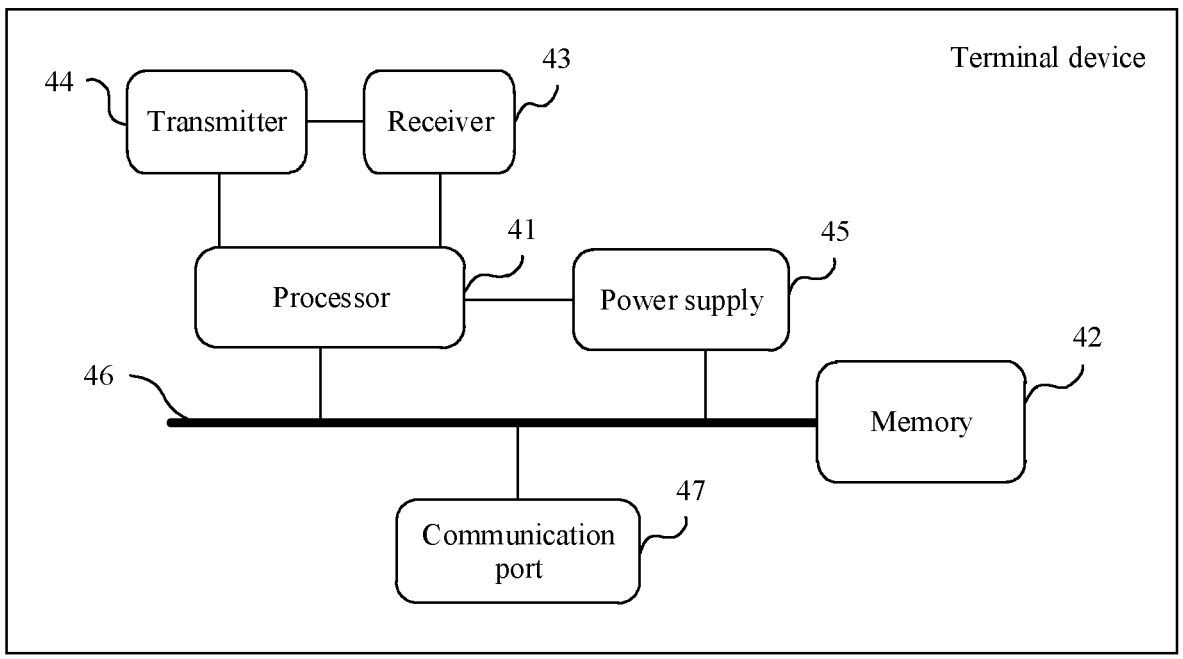
FIG. 10 is a schematic structural diagram of another terminal device according to an embodiment of this application.

FIG. 10 is a schematic structural diagram of another terminal device according to an embodiment of this application. As shown in FIG. 10, the terminal device may include a processor 41 (for example, a CPU), a memory 42, a receiver 43, and a transmitter 44. The receiver 43 and the transmitter 44 both are coupled to the processor 41, the processor 41 controls a receiving action of the receiver 43, and the processor 41 controls a sending action of the transmitter 44. The memory 42 may include a high-speed RAM memory, and may further include a non-volatile memory NVM, for example, at least one magnetic disk storage. The memory 42 may store various instructions, to complete various processing functions and implement method steps in this application. Optionally, the terminal device in this application may further include a power supply 45, a communication bus 46, and a communication port 47. The receiver 43 and the transmitter 44 may be integrated into a transceiver of the terminal device, or may be independent transceiver antennas of the terminal device. The communication bus 46 is configured to implement communication connection between components. The communication port 47 is configured to implement connection and communication between the terminal device and another peripheral.

In this application, the memory 42 is configured to store computer-executable program code, and the program code includes instructions. When the processor 41 executes the instructions, by using the instructions, the processor 41 of the terminal device is enabled to perform a processing action of the terminal device in the foregoing method embodiments, the receiver 43 is enabled to perform a receiving action of the terminal device in the foregoing method embodiments, and the transmitter 44 is enabled to perform a sending action of the terminal device in the foregoing method embodiments. Implementation principles and technical effects thereof are similar. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The term "a plurality of" in this specification refers to two or more than two. The term "and/or" in this specification describes only an association relationship for associated objects and represents that three relationships may exist. For example, A and/or B may represent the following three cases: Only A exists, both A and B exist, and only B exists. In addition, the character "/" in this specification generally indicates an "or" relationship between the associated objects. In the formula, the character "/" indicates a "division" relationship between the associated objects.

It is to be understood that various numbers in the embodiments of this application are merely used for differentiation for ease of description, and are not used to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. A delay measurement method, comprising:
 receiving, by a network device, first information from a core network, the first information including a request for the network device to measure a transmission delay between the network device and a terminal device;
 determining, by the network device, the transmission delay between the network device and the terminal device following receipt of the first information using a protocol data unit (PDU) corresponding to a quality of service flow;
 constraining the effective time of the transmission delay determination result based on a first preset duration; and sending, by the network device, second information to the core network within the first preset duration, the second information indicating the determined transmission delay.

2. The method according to claim 1, the transmission delay being determined:
through measurement of a transmission delay of a data packet transmitted between the network device and the terminal device after the network device receives the first information; or
by the network device within a second preset duration that is prior to network device receipt of the first information.

3. The method according to claim 2, the transmission delay between the network device and the terminal device comprising an uplink transmission delay between the network device and the terminal device.

4. The method according to claim 1, further comprising:
when the network device fails to determine the transmission delay within the first preset duration, sending, by the network device, third information to the core network, the third information indicating a failure in measurement of the transmission delay between the network device and the terminal device.

5. The method according to claim 1, wherein:
the protocol data unit (PDU) is an uplink PDU received from the terminal device, the uplink PDU comprising time information for generating the uplink PDU by a radio access-stratum protocol layer of the terminal device; and
the uplink transmission delay between the network device and the terminal device is determined based on the time information for generating the uplink PDU and a time at which a radio access-stratum protocol layer of the network device receives the uplink PDU.

6. The method according to claim 1, the obtaining of a transmission delay measurement result comprising:
receiving, by the network device, an uplink PDU from the terminal device, the uplink PDU comprising an uplink service data unit (SDU) and time information for receiving the uplink SDU by a radio access-stratum protocol layer of the terminal device; and
determining, by the network device, an uplink transmission delay between the network device and the terminal device based on the time information for receiving the uplink SDU by the radio access-stratum protocol layer of the terminal device and a time at which a radio access-stratum protocol layer of the network device sends the uplink SDU to a protocol layer higher than the radio access-stratum protocol layer.

7. The delay measurement method according to claim 1, wherein the first preset duration is at a 5G quality of service identifier level.

8. A delay measurement method, comprising:
receiving, by a network device, first information from a core network, the first information including a request for the network device to measure a transmission delay between the network device and a terminal device;
determining, by the network device, the transmission delay between the network device and the terminal device following receipt of the first information;
sending, by the network device, second information to the core network within a first preset duration, the second information indicating the determined transmission delay; and the method further comprising:
receiving, by the network device, fourth information from the core network, the fourth information indicating the first preset duration, the network device comprising a control unit-user plane (CU-UP) and a control unit-control plane (CU-CP), and the fourth information being sent from the CU-CP to the CU-UP.

9. A network device, comprising:
a processor;
a memory storing a program comprising instructions that, when executed by the processor, cause the network device to:
receive first information from a core network, the first information including a request for the network device to measure a transmission delay between the network device and a terminal device;
determine the transmission delay between the network device and the terminal device in accordance with the first information using a protocol data unit (PDU) corresponding to a quality of service flow;
constrain the effective time of the transmission delay determination result based on a first preset duration; and
send second information to the core network within the first preset duration, the second information indicating the determined transmission delay.

10. The network device according to claim 9, the transmission delay being determined:
through measurement of a transmission delay of a data packet between the network device and the terminal device after the network device receives the first information; or
by the network device within a second preset duration that is prior to the network device receiving the first information.

11. The network device according to claim 9, the apparatus being configured to send third information to the core network when the transmission delay measurement result fails to be determined within the first preset duration, the third information indicating a failure in measurement of the transmission delay between the network device and the terminal device.

12. The network device according to claim 9, the apparatus being configured to receive fourth information from the core network, the fourth information indicating the first preset duration.

13. The network device according to claim 10, the transmission delay comprising an uplink transmission delay between the network device and the terminal device.

14. The network device according to claim 9, wherein the instructions, when executed by the processor, cause the network device to:
receive an uplink protocol data unit (PDU) from the terminal device, the uplink PDU comprising time information for generating the uplink PDU by a radio access-stratum protocol layer of the terminal device; and
determine a measurement result of an uplink transmission delay between the network device and the terminal device based on the time information for generating the uplink PDU by the radio access-stratum protocol layer of the terminal device and a time at which a radio access-stratum protocol layer of the network device receives the uplink PDU.

15. The network device according to claim 9, wherein the instructions, when executed by the processor, cause the network device to:

receive an uplink PDU from the terminal device, the uplink PDU comprising an uplink service data unit (SDU) and time information for receiving the uplink SDU by a radio access-stratum protocol layer of the terminal device; and determine a measurement result of an uplink transmission delay between the network device and the terminal device based on the time information for receiving the uplink SDU by the radio access-stratum protocol layer of the terminal device and a time at which a radio access-stratum protocol layer of the network device sends the uplink SDU to a protocol layer upper than the radio access-stratum protocol layer.

16. A non-transitory computer readable medium storing program code for use by a processing system to measure delay between a network device and a terminal device, wherein the program code includes instructions to cause the network device to:

receive first information from a core network, the first information including a request for the network device to measure a transmission delay between the network device and a terminal device;

determine the transmission delay between the network device and the terminal device following receipt of the first information using a protocol data unit (PDU) corresponding to a quality of service flow;

constrain the effective time of the transmission delay determination result based on a first preset duration; and send second information to the core network within the first preset duration, the second information indicating the determined transmission delay.

17. The non-transitory computer readable medium according to claim 16, wherein the transmission delay is determined:

through measurement of a transmission delay of a data packet transmitted between the network device and the terminal device after the network device receives the first information; or by the network device within a second preset duration that is prior to network device receipt of the first information.

18. The non-transitory computer readable medium according to claim 16, wherein the transmission delay between the network device and the terminal device comprises an uplink transmission delay between the network device and the terminal device.

19. The non-transitory computer readable medium according to claim 16, wherein the program code further includes instructions to cause the network device to: send third information to the core network when the network device fails to determine the transmission delay within the first preset duration, the third information indicating a failure in measurement of the transmission delay between the network device and the terminal device.

* * * * *